(12) United States Patent
Aikawa et al.

(10) Patent No.: US 11,892,416 B2
(45) Date of Patent: Feb. 6, 2024

(54) SURFACE INSPECTION APPARATUS, NON-TRANSITORY COMPUTER READABLE MEDIUM STORING PROGRAM, AND SURFACE INSPECTION METHOD

(71) Applicant: FUJIFILM Business Innovation Corp., Tokyo (JP)

(72) Inventors: Kiyofumi Aikawa, Kanagawa (JP); Takashi Hiramatsu, Kanagawa (JP); Kaito Tasaki, Kanagawa (JP); Miho Uno, Kanagawa (JP); Hirokazu Ichikawa, Kanagawa (JP); Hiroko Onuki, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 317 days.

(21) Appl. No.: 17/517,643

(22) Filed: Nov. 2, 2021

(65) Prior Publication Data
US 2022/0390385 A1 Dec. 8, 2022

(30) Foreign Application Priority Data
Jun. 8, 2021 (JP) .................................. 2021-095768

(51) Int. Cl.
*G01N 21/88* (2006.01)
*G06T 7/70* (2017.01)
*G06T 7/00* (2017.01)

(52) U.S. Cl.
CPC ....... *G01N 21/8851* (2013.01); *G06T 7/0002* (2013.01); *G06T 7/70* (2017.01); *G01N 2021/8854* (2013.01)

(58) Field of Classification Search
CPC ........ G01N 21/8851; G01N 2021/8854; G06T 7/70; G06T 7/0002
See application file for complete search history.

(56) References Cited

U.S. PATENT DOCUMENTS

| 10,634,611 B2 | 4/2020 | Kawanago |
| 2018/0113073 A1* | 4/2018 | Kawanago ........... G01N 21/474 |

FOREIGN PATENT DOCUMENTS

| JP | 2007285754 | 11/2007 |
| JP | 2008241407 | 10/2008 |
| JP | 2018066712 | 4/2018 |

* cited by examiner

*Primary Examiner* — Jamil Ahmed
(74) *Attorney, Agent, or Firm* — JCIPRNET

(57) ABSTRACT

A surface inspection apparatus includes an imaging device configured to image a surface of an object to be inspected, and a processor configured to: calculate a numerical value representing a quality of the surface by processing an image captured by the imaging device, and notify a user of information indicating a relationship between a first orientation of a pattern on the surface detected from the image and a second orientation that gives a direction of imaging in which a sensitivity of detection by the imaging device is high.

20 Claims, 22 Drawing Sheets

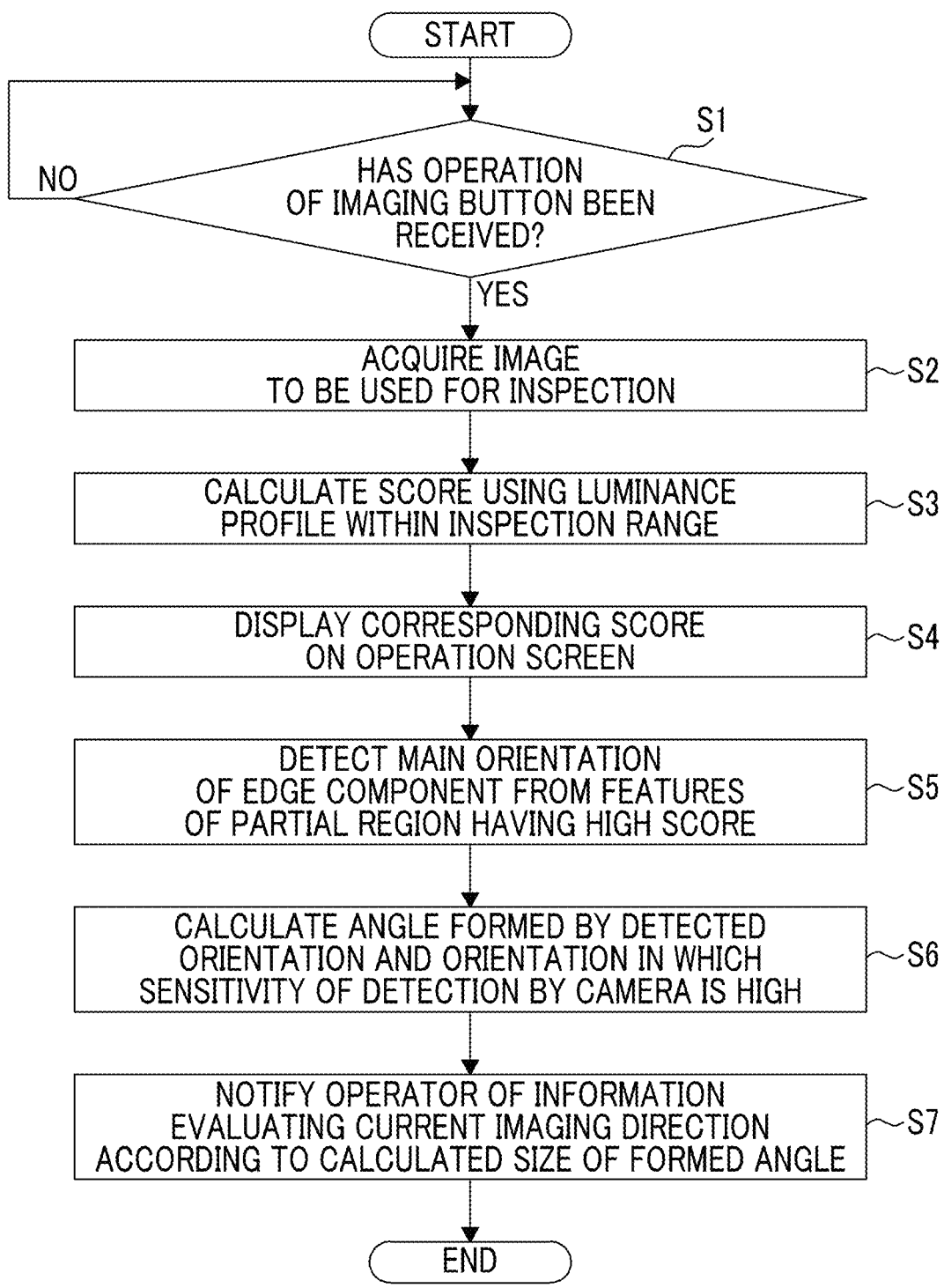

SURFACE INSPECTION APPARATUS, NON-TRANSITORY COMPUTER READABLE MEDIUM STORING PROGRAM, AND SURFACE INSPECTION METHOD

CROSS-REFERENCE TO RELATED APPLICATIONS

This application is based on and claims priority under 35 USC 119 from Japanese Patent Application No. 2021-095768 filed Jun. 8, 2021.

BACKGROUND

(i) Technical Field

The present invention relates to a surface inspection apparatus, a non-transitory computer readable medium storing a program, and a surface inspection method.

(ii) Related Art

Today, in various products, parts made by molding synthetic resin (hereinafter referred to as "molded products") are used. On the other hand, visually observable defects may appear on the surface of the molded product. This type of defect includes a "sink mark" that is an unintentionally formed dent, a "weld" that is formed at a portion where the molten resin joins, and the like.

SUMMARY

An apparatus that inspects the quality of the surface of an object (hereinafter also referred to as a "surface inspection apparatus") primarily images a light component that is specularly reflected on the surface of the object to be inspected, and inspects the presence or absence of defects by analyzing the captured image.

By the way, defects such as sink marks basically have a linear pattern. In the case of a linear pattern, the distribution of reflected light components is anisotropic. For example, the intensity of the light component that is specularly reflected in the direction orthogonal to the pattern is strong, and the intensity of the light component that is specularly reflected in the direction parallel to the pattern is weak. Therefore, it is required that the surface inspection apparatus correctly positions the orientation of the pattern formed on the surface to be inspected.

An example of related art includes JP2018-66712A.

Aspects of non-limiting embodiments of the present disclosure relate to a surface inspection apparatus and a non-transitory computer readable medium storing a program that make it possible to improve the accuracy of inspection as compared with the case of inspecting a pattern having anisotropy without considering an orientation of imaging of a surface inspection apparatus having anisotropy in detection sensitivity.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a surface inspection apparatus including an imaging device configured to image a surface of an object to be inspected, and a processor configured to: calculate a numerical value representing a quality of the surface by processing an image captured by the imaging device, and notify a user of information indicating a relationship between a first orientation of a pattern on the surface detected from the image and a second orientation that gives a direction of imaging in which a sensitivity of detection by the imaging device is high.

BRIEF DESCRIPTION OF THE DRAWINGS

Exemplary embodiment(s) of the present invention will be described in detail based on the following figures, wherein:

FIG. 2A shows an example of sink marks, and FIG. 2B shows an example of a weld;

FIGS. 4A and 4B are diagrams illustrating a structural example of an optical system of the surface inspection apparatus according to the first exemplary embodiment, in which FIG. 4A shows schematically an internal structure of a housing of the surface inspection apparatus and FIG. 4B shows a structure of an opening portion pressed against the surface of an inspection target at the time of inspection;

FIGS. 6A to 6C are diagrams illustrating a relationship between the direction of imaging and a luminance profile generated from a captured image, in which FIG. 6A shows the luminance profile in a case where the image is captured in a "direction A", FIG. 6B shows the luminance profile in a case where the image is captured in a "direction B", and FIG. 6C shows the luminance profile in a case where the image is captured in a "direction C";

FIG. 7 is a flowchart illustrating an example of an inspection operation by the surface inspection apparatus used in the first exemplary embodiment;

FIGS. 10A to 10C are diagrams illustrating an example of notification of an evaluation result of an imaging direction using an information field indicating a positional relationship, in which FIG. 10A is an example of notification in a case where the sink mark to be inspected is imaged from the "direction A", FIG. 10B is an example of notification in a case where the sink mark to be inspected is imaged from the "direction B", and FIG. 10C is an example of notification in a case where the sink mark to be inspected is imaged from the "direction C";

FIGS. 11A to 11C are diagrams illustrating an example of notification of the evaluation result using an auxiliary line indicating a direction of a detected edge, in which FIG. 11A is an example of notification in a case where the sink mark to be inspected is imaged from the "direction A", FIG. 11B is an example of notification in a case where the sink mark to be inspected is imaged from the "direction B", and FIG.

Figure 12A:
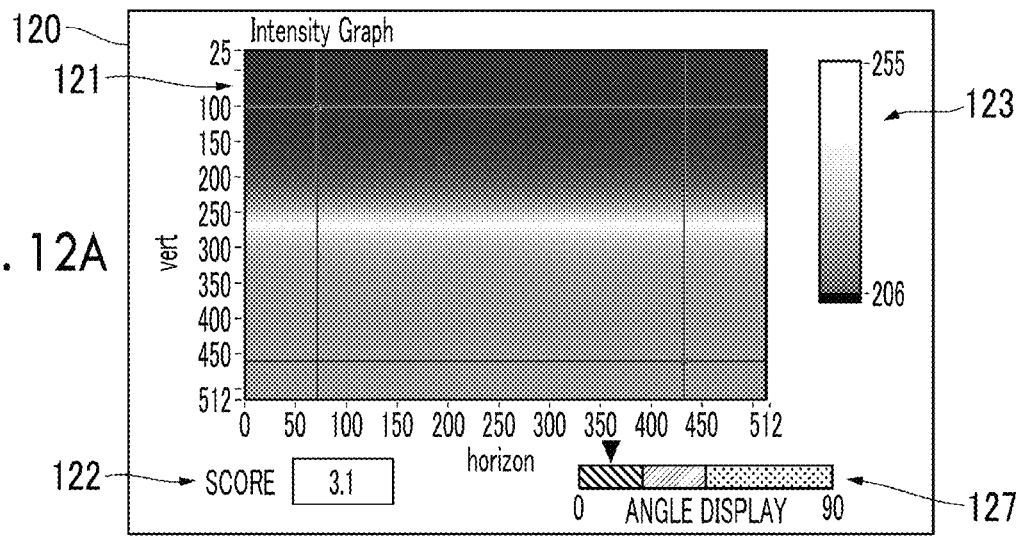
Figure 12B:
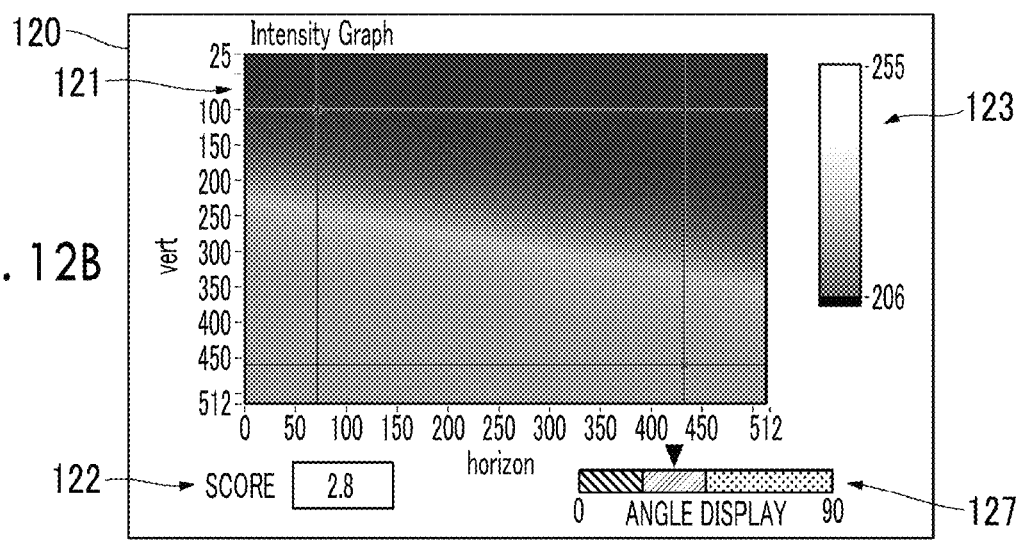
Figure 12C:
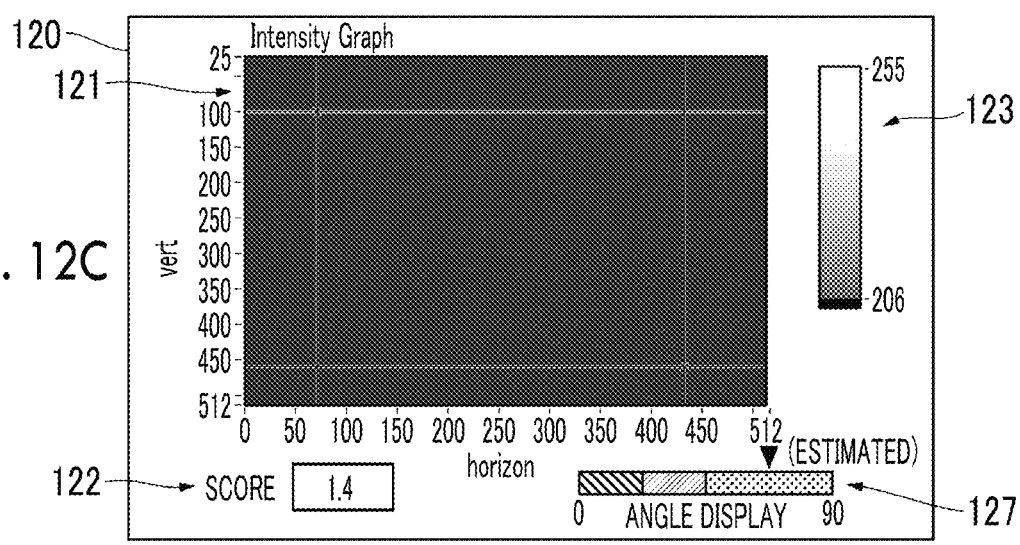
Figure 13A:
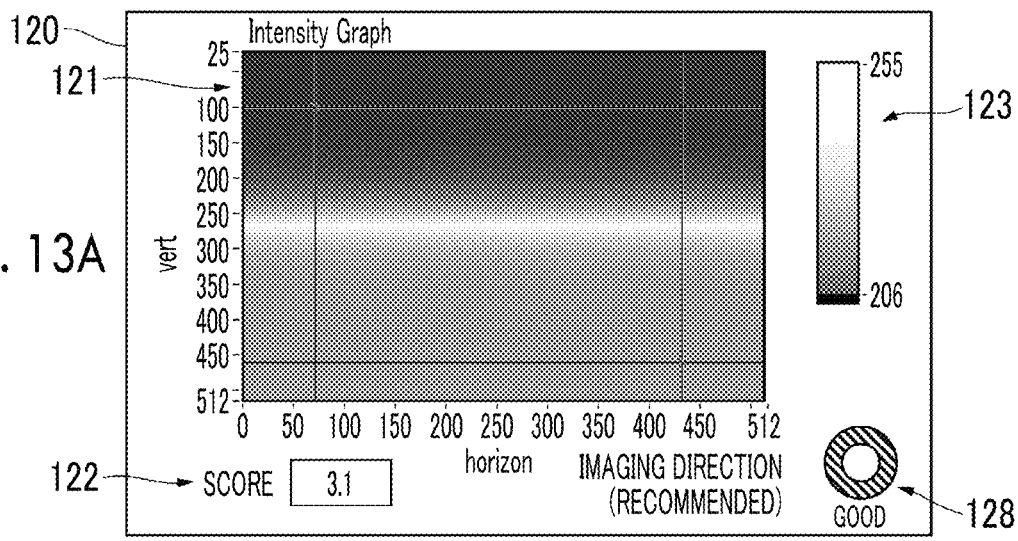
Figure 13B:
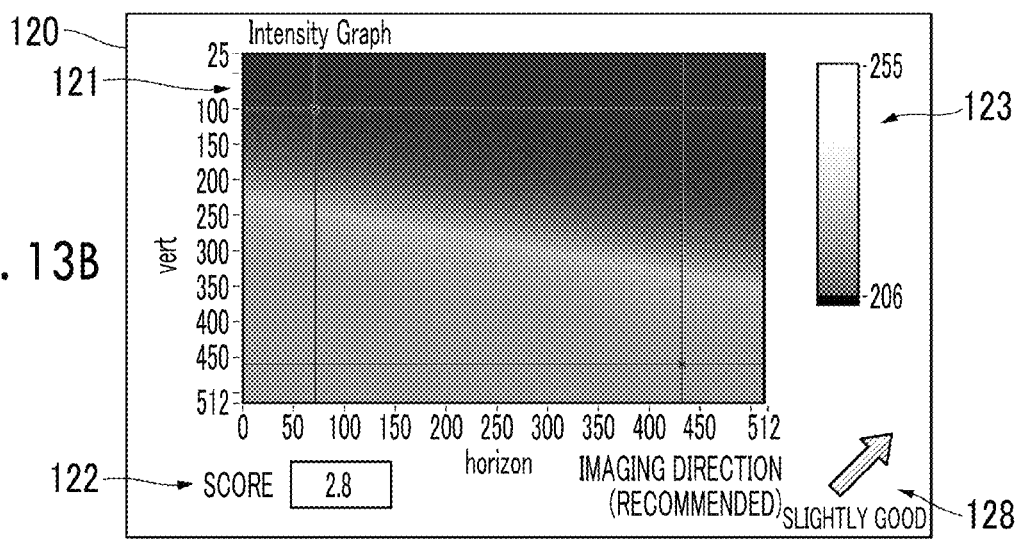
Figure 13C:
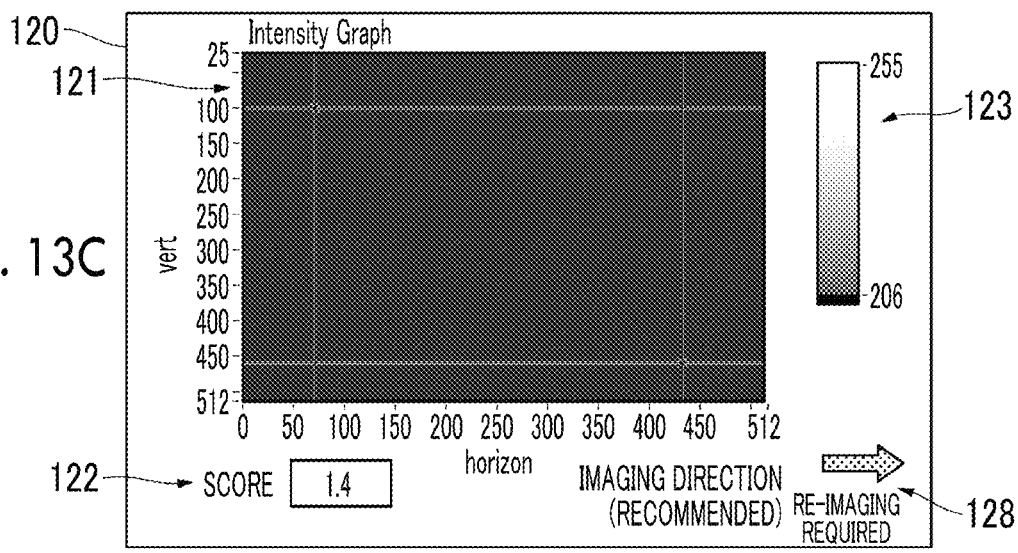
Figure 14A:
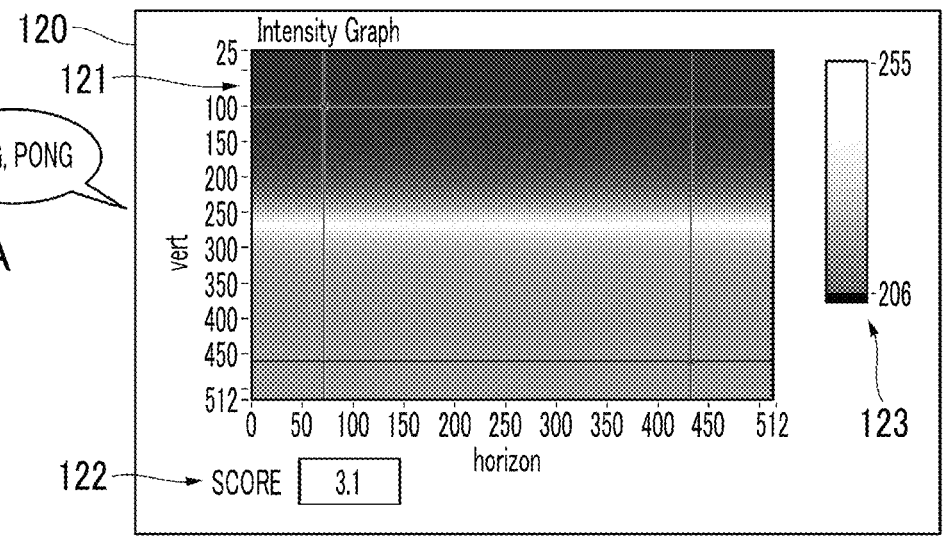
Figure 14B:
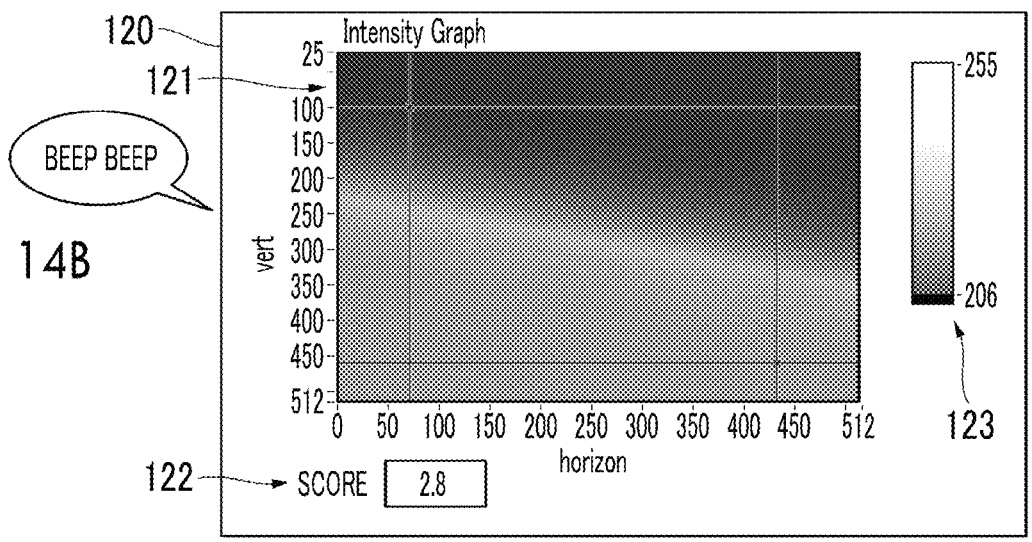
Figure 14C:
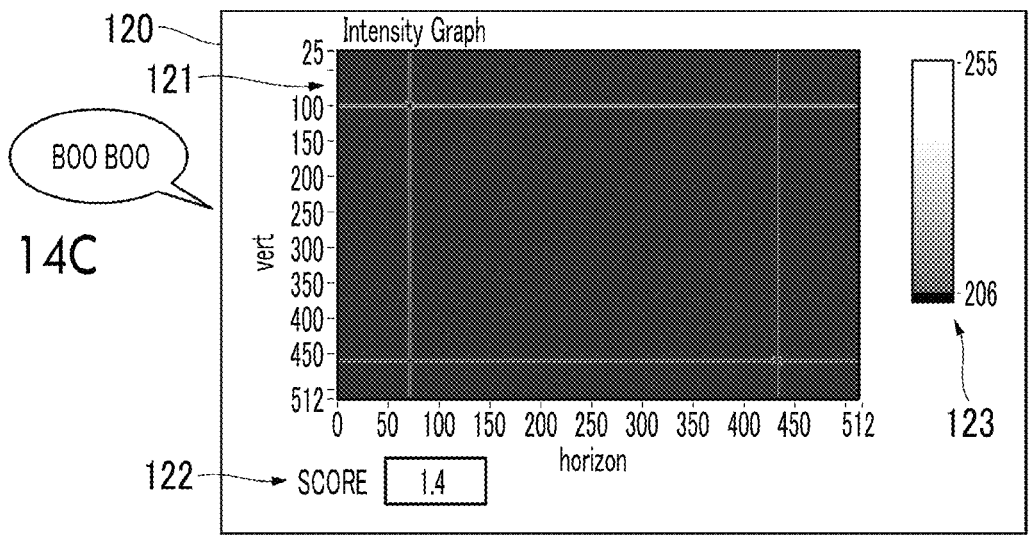
Figure 15A:
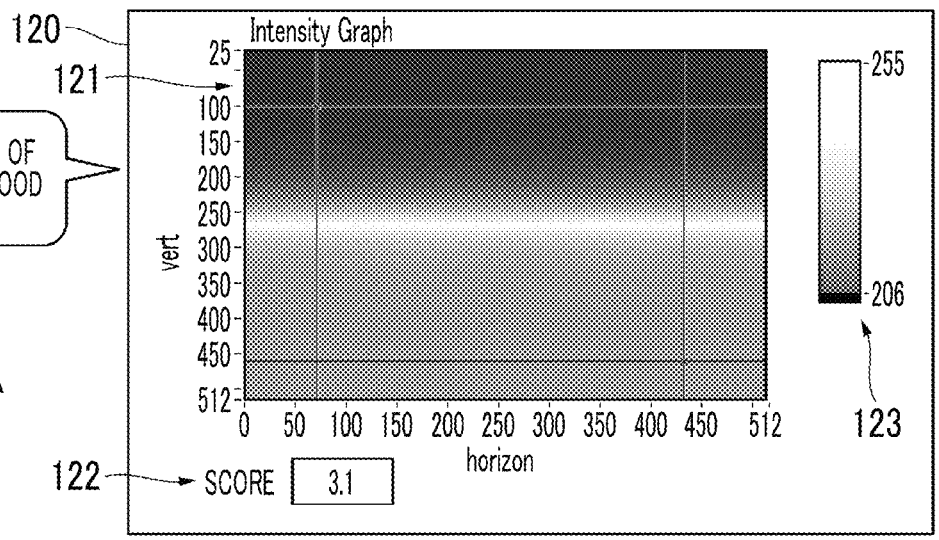
Figure 15B:
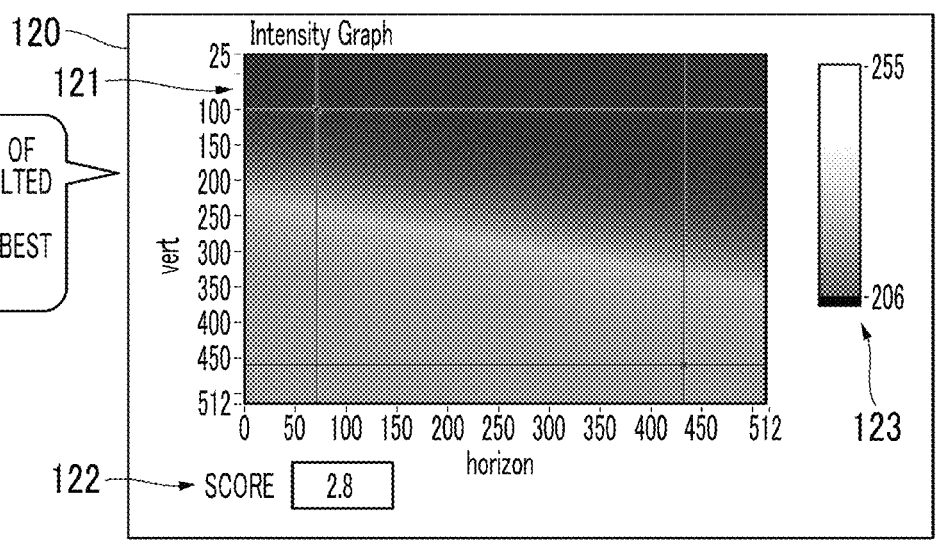
Figure 15C:
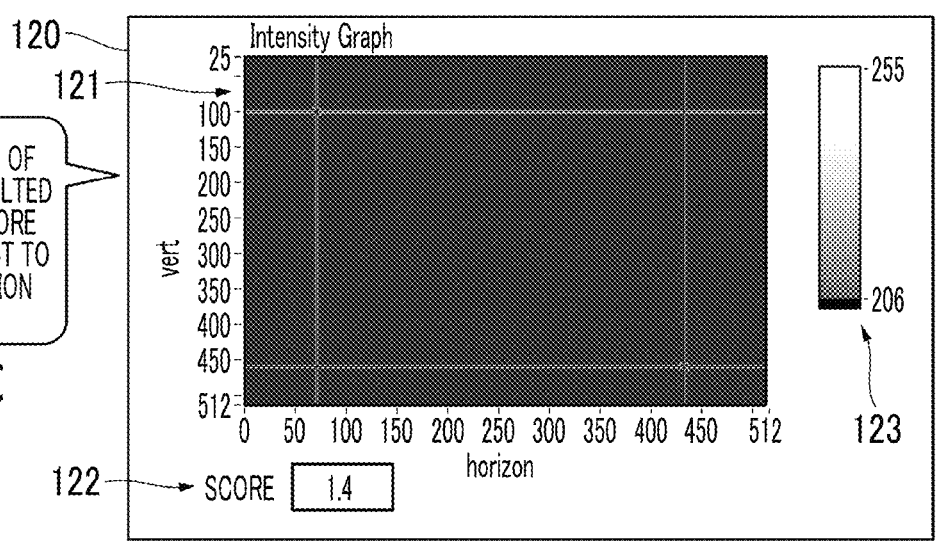
Figure 16A:
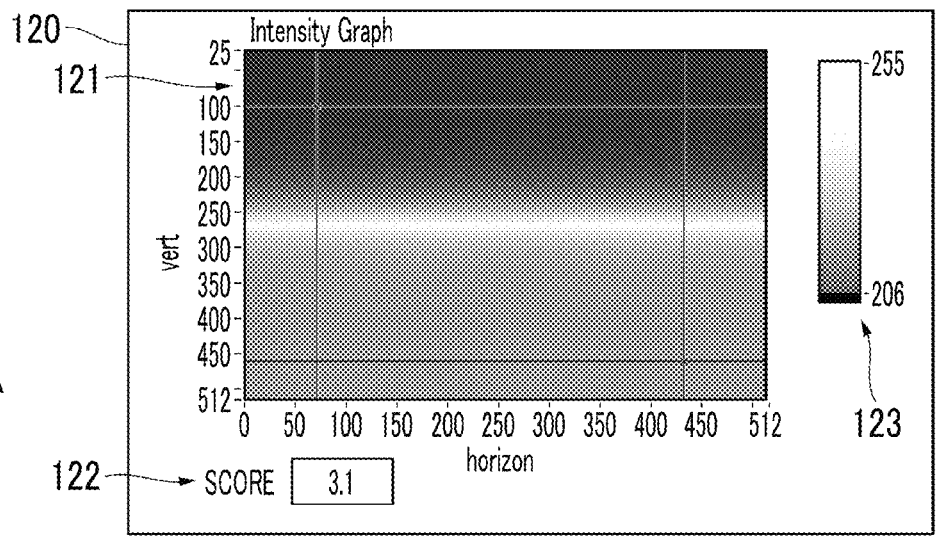
Figure 16B:
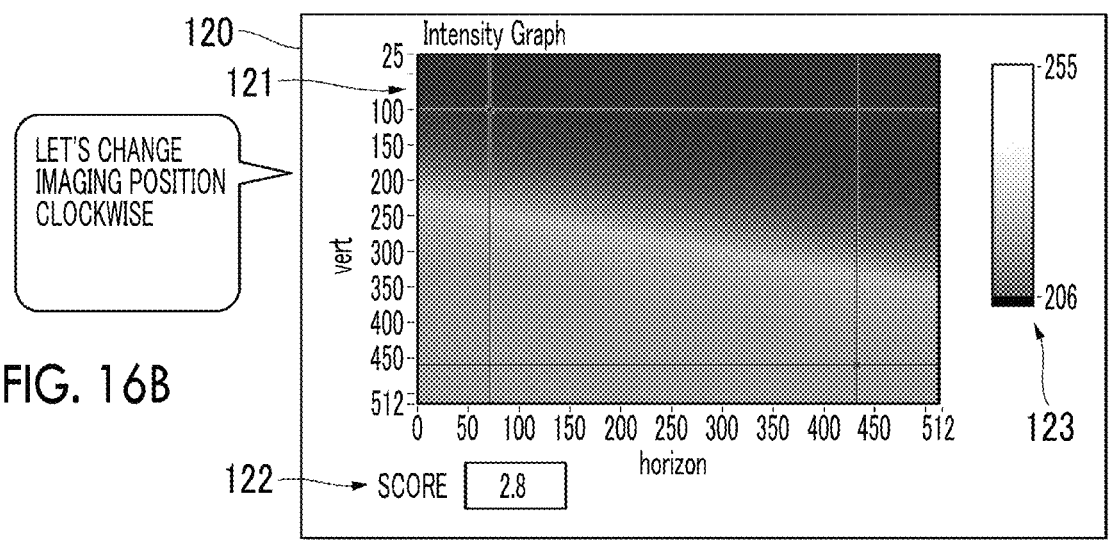
Figure 16C:
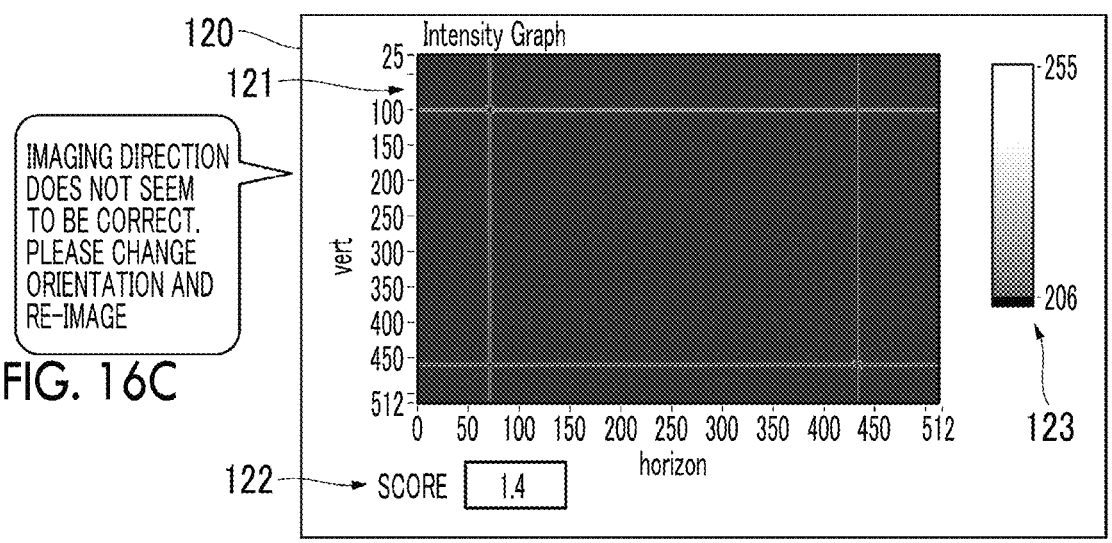
Figure 17:
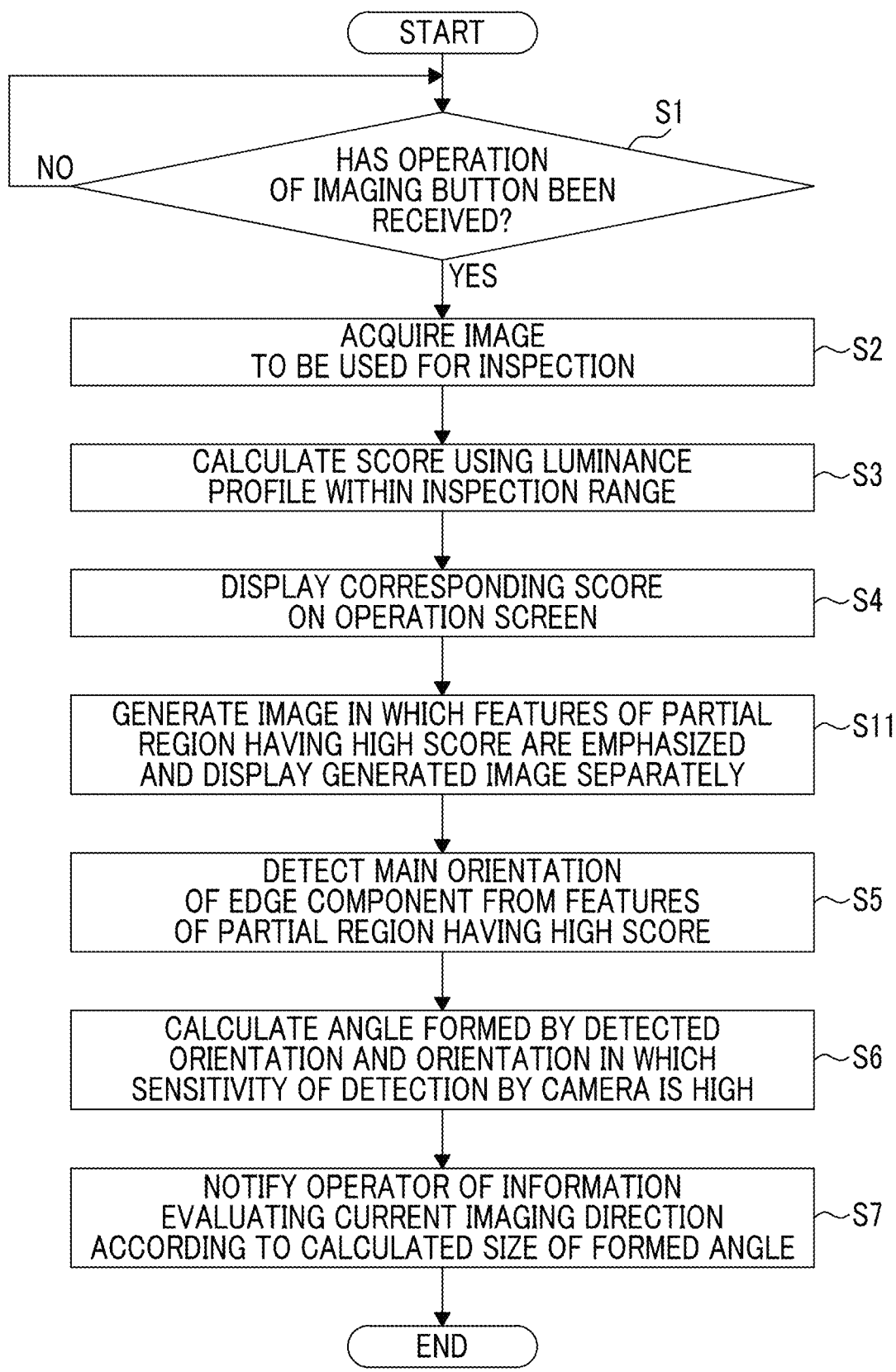
Figure 18:
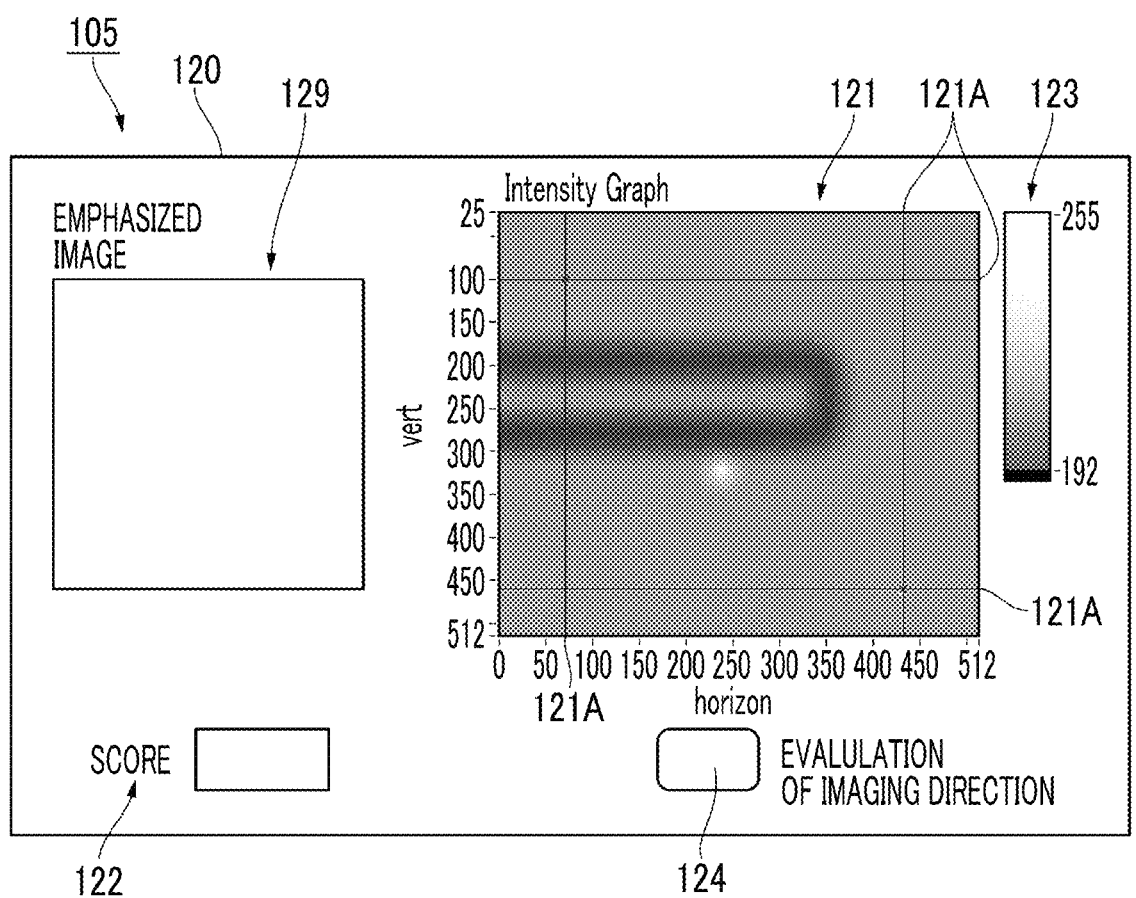
Figure 19A:
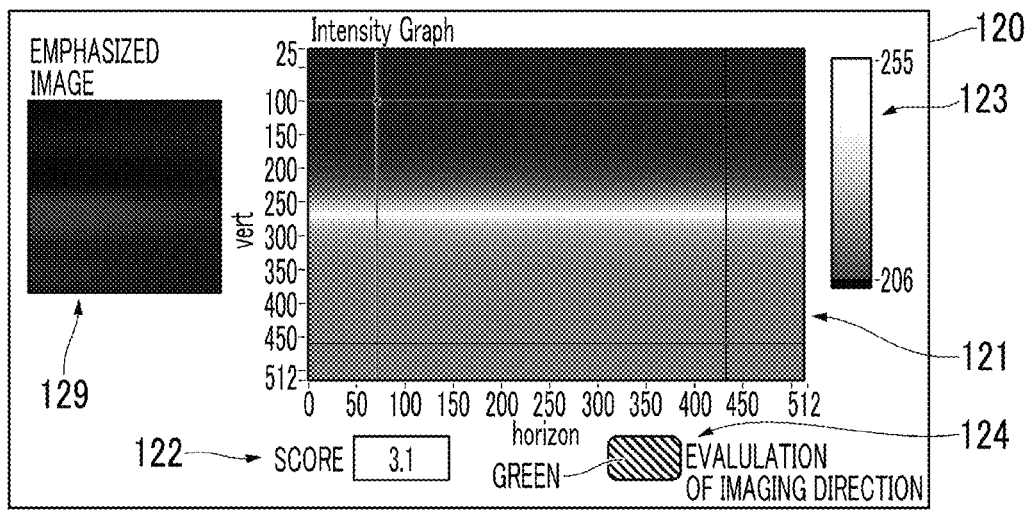
Figure 19B:
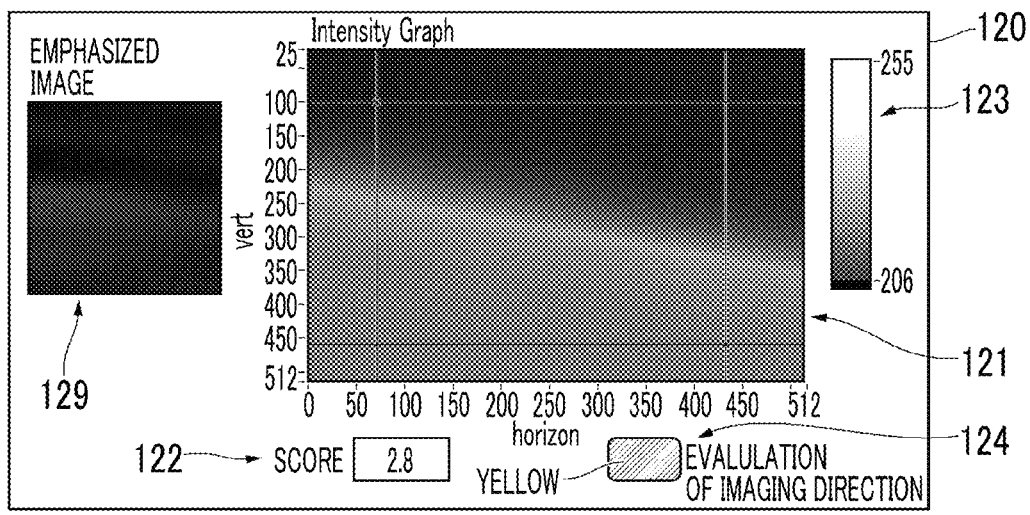
Figure 19C:
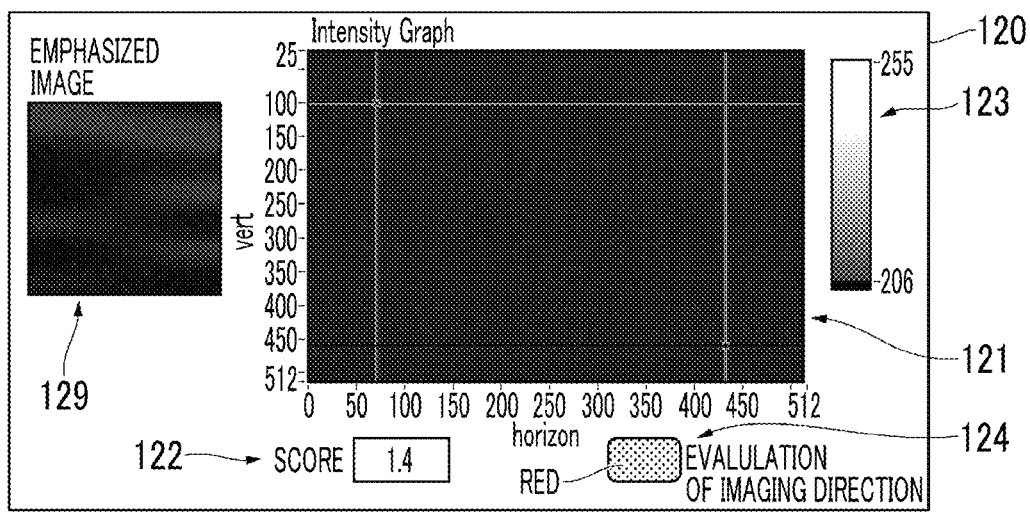
Figure 20:
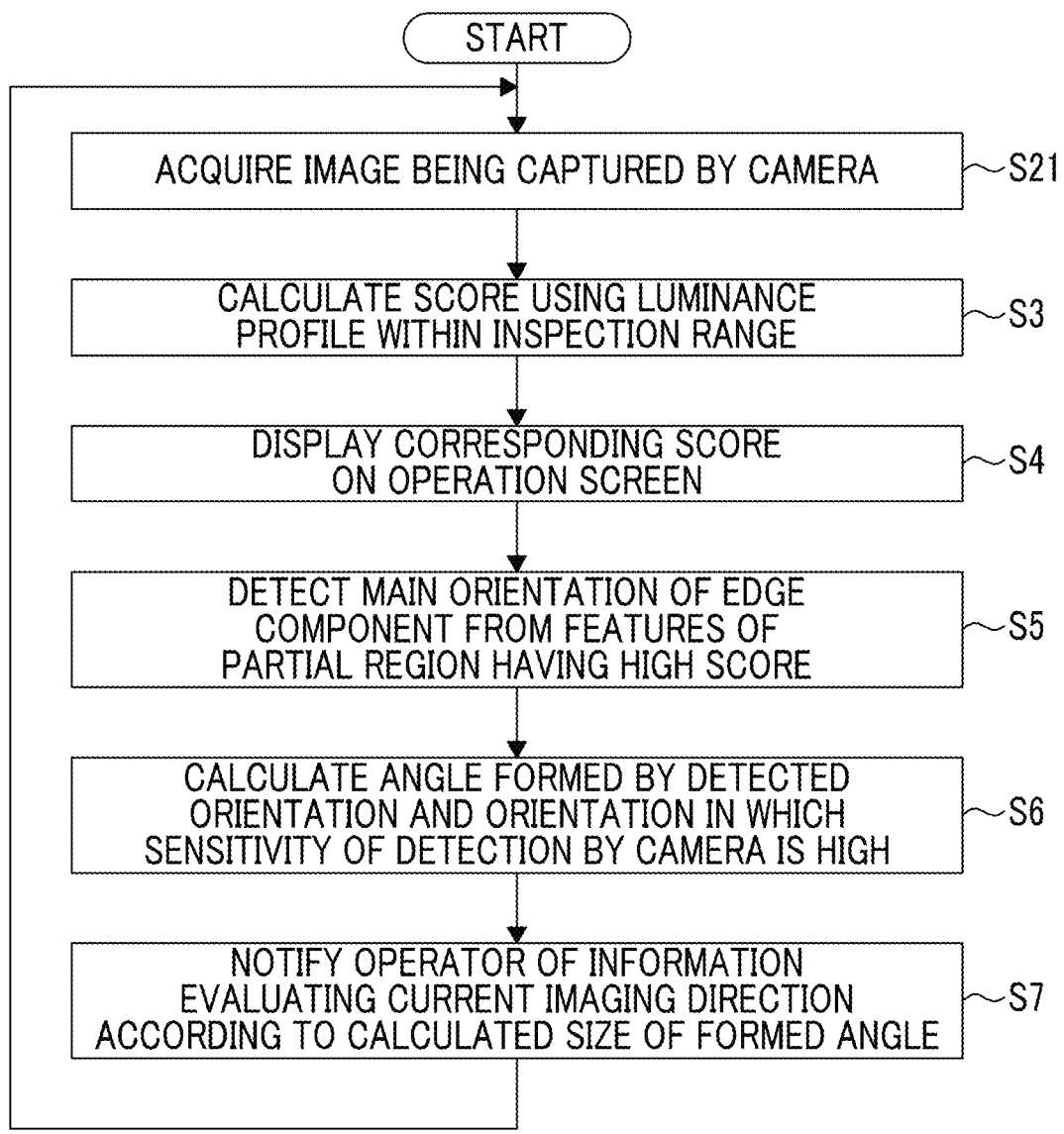
Figure 21:
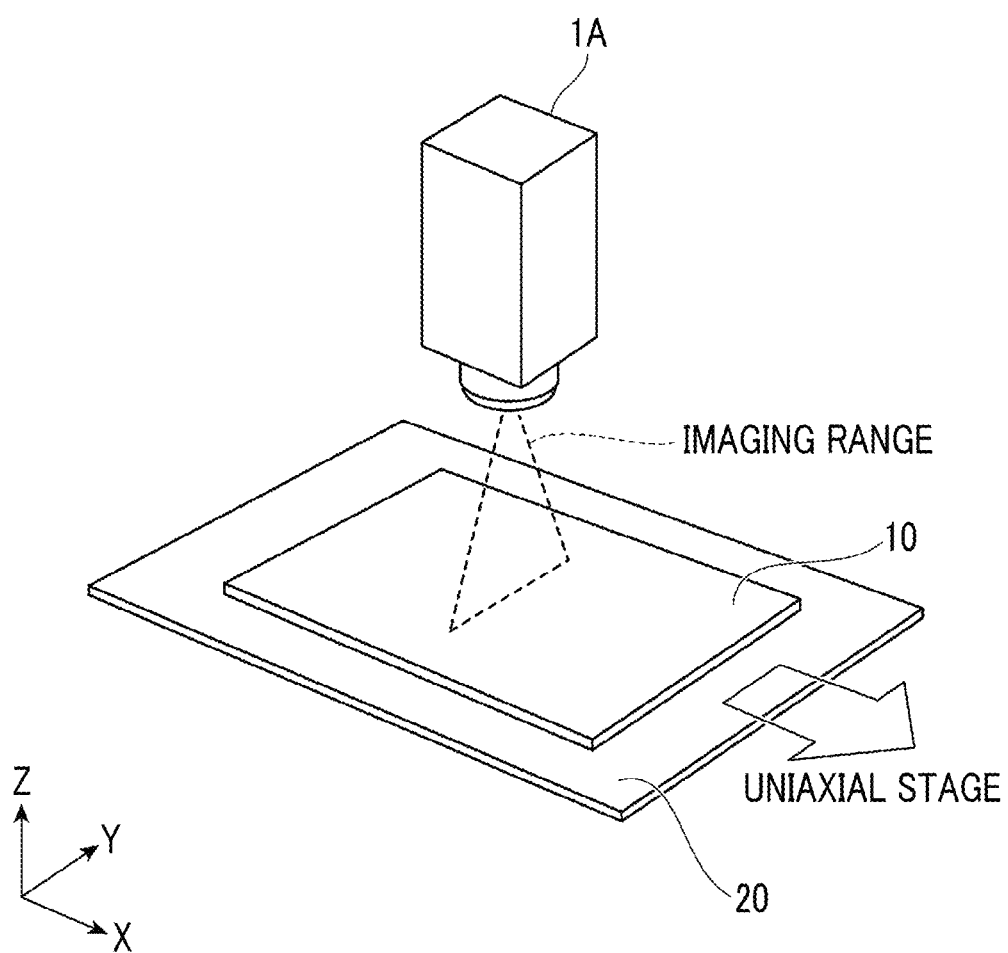
Figure 22:
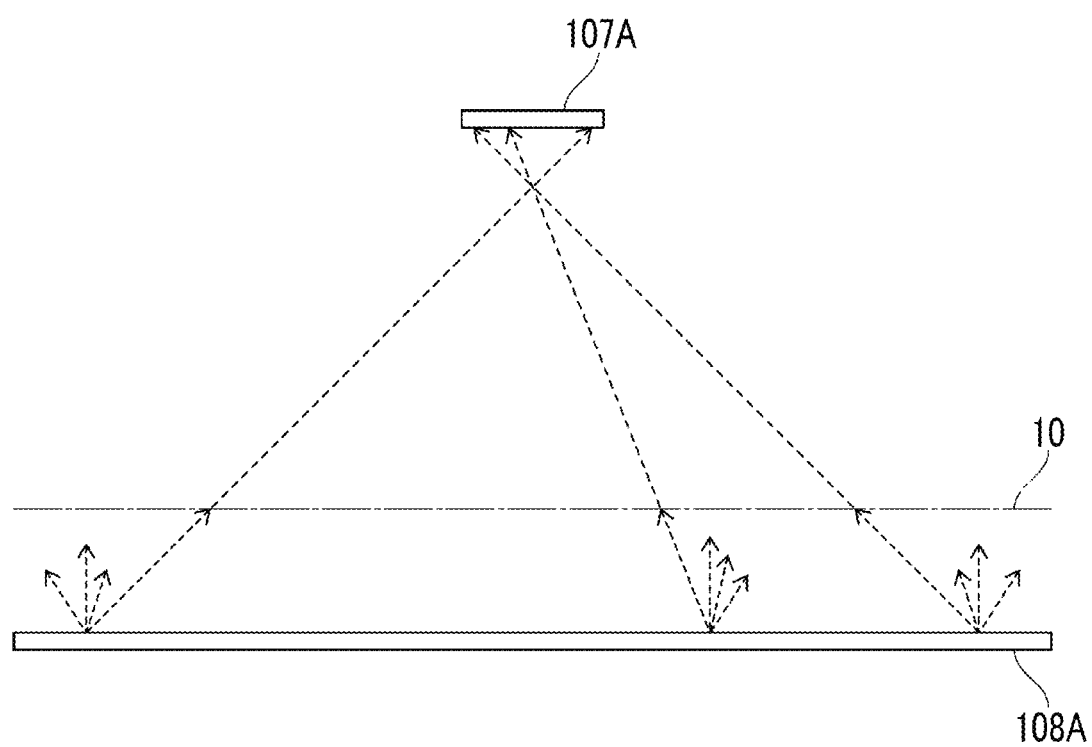

11C is an example of notification in a case where the sink mark to be inspected is imaged from the "direction C";

FIGS. 12A to 12C are diagrams illustrating an example of notification of the evaluation result using an indicator, in which FIG. 12A is an example of notification in a case where the sink mark to be inspected is imaged from the "direction A", FIG. 12B is an example of notification in a case where the sink mark to be inspected is imaged from the "direction B", and FIG. 12C is an example of notification in a case where the sink mark to be inspected is imaged from the "direction C";

FIGS. 13A to 13C are diagrams illustrating an example of notification of a recommended direction of imaging using figures, text, and the like, in which FIG. 13A is an example of notification in a case where the sink mark to be inspected is imaged from the "direction A", FIG. 13B is an example of notification in a case where the sink mark to be inspected is imaged from the "direction B", and FIG. 13C is an example of notification in a case where the sink mark to be inspected is imaged from the "direction C";

FIGS. 14A to 14C are diagrams illustrating an example of notification of the evaluation result by a sound effect, in which FIG. 14A is an example of notification in a case where the sink mark to be inspected is imaged from the "direction A", FIG. 14B is an example of notification in a case where the sink mark to be inspected is imaged from the "direction B", and FIG. 14C is an example of notification in a case where the sink mark to be inspected is imaged from the "direction C";

FIGS. 15A to 15C are diagrams illustrating an example of notification of the evaluation result by voice, in which FIG. 15A is an example of notification in a case where the sink mark to be inspected is imaged from the "direction A", FIG. 15B is an example of notification in a case where the sink mark to be inspected is imaged from the "direction B", and FIG. 15C is an example of notification in a case where the sink mark to be inspected is imaged from the "direction C";

FIGS. 16A to 16C are diagrams illustrating another example of notification of the evaluation result by voice, in which FIG. 16A is an example of notification in a case where the sink mark to be inspected is imaged from the "direction A", FIG. 16B is an example of notification in a case where the sink mark to be inspected is imaged from the "direction B", and FIG. 16C is an example of notification in a case where the sink mark to be inspected is imaged from the "direction C";

FIG. 17 is a flowchart illustrating an example of an inspection operation by a surface inspection apparatus used in a third exemplary embodiment;

FIG. 18 is a diagram illustrating an example of an operation screen displayed on a display;

FIGS. 19A to 19C are diagrams illustrating a display example of an operation screen including an emphasized image field, in which FIG. 19A is a display example in a case where the sink mark to be inspected is imaged from the "direction A", FIG. 19B is a display example in a case where the sink mark to be inspected is imaged from the "direction B", and FIG. 19C is a display example in a case where the sink mark to be inspected is imaged from the "direction C";

FIG. 20 is a flowchart illustrating an example of an inspection operation by a surface inspection apparatus used in a fourth exemplary embodiment;

FIG. 21 is a diagram illustrating a structural example of an optical system of a surface inspection apparatus according to a fifth exemplary embodiment; and FIG. 22 is a diagram illustrating optical conditions required in a case where a line camera having an angle of view is used.

DETAILED DESCRIPTION

First Exemplary Embodiment

Usage Example of Surface Inspection Apparatus

Hereinafter, exemplary embodiments of the present invention will be described with reference to the drawings.

Figure 1:
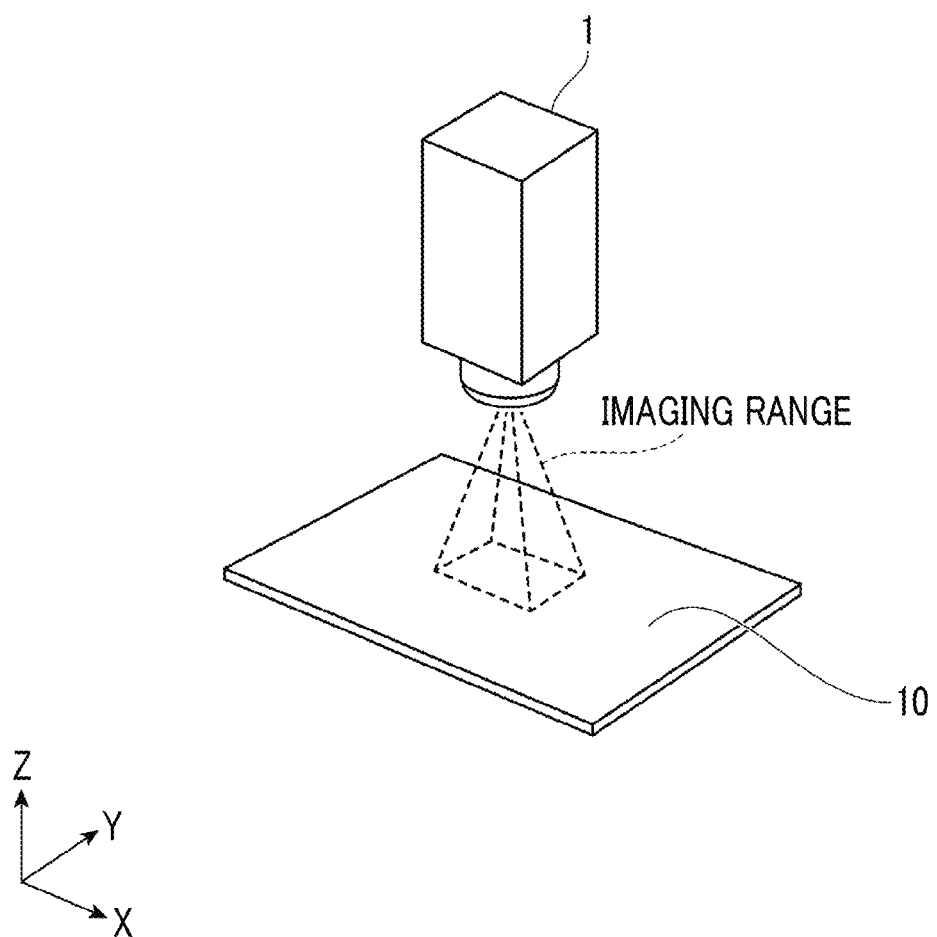
FIG. 1 is a diagram illustrating a usage example of a surface inspection apparatus assumed in a first exemplary embodiment.

FIG. 1 is a diagram illustrating a usage example of a surface inspection apparatus 1 assumed in a first exemplary embodiment.

An imaging unit of the surface inspection apparatus 1 used in the first exemplary embodiment is a so-called area camera, and a range to be imaged (hereinafter referred to as an "imaging range") is defined by a surface. Illuminations (not shown) are configured to include components that are specular reflection conditions over the entire imaging range.

In the case of FIG. 1, the imaging range images only a part of an object to be inspected (hereinafter also referred to as an "inspection target") 10 of interest. A molded product is assumed as the inspection target 10 in the present exemplary embodiment.

In the case of the inspection by the area camera, the inspection by the surface inspection apparatus 1 and the inspection target 10 is performed in a stationary state. In other words, the inspection of the surface of the inspection target 10 is performed in a state where the surface inspection apparatus 1 and the inspection target 10 do not move relatively.

In the case of FIG. 1, the inspection target 10 has a plate shape, but the inspection target 10 may have any shape. For example, the inspection target 10 may have a shape having a curved surface such as a sphere or a cylinder, in addition to a polyhedron, for example.

The actual inspection target 10 may have holes, notches, protrusions, steps, and the like.

The types of surface finishes of the inspection target 10 include no processing, mirror finish processing, semi-mirror finish processing, and texturing processing.

The surface inspection apparatus 1 inspects defects on the surface and textures of the inspection target 10.

Defects include, for example, sink marks and welds. The sink mark refers to a dent on the surface generated in the thick portion or the rib portion, and the weld refers to a streak generated in the portion where the tips of the molten resin join in the mold. The defects also include scratches and dents caused by hitting an object. Sink marks and welds are examples of one-dimensional patterns.

The texture is a visual or tactile impression, and is influenced by the color, luster, and unevenness of the surface of the object. The unevenness of the surface also includes streaks generated in cutting the mold. This type of streak is different from a defect.

Figure 2A:
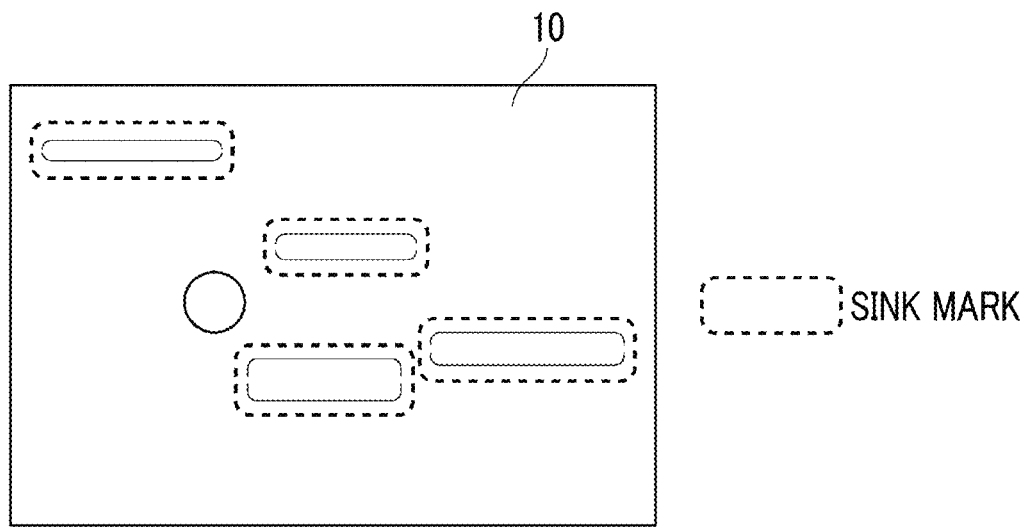
FIGS. 2A and 2B are diagrams illustrating an example of defects appearing on the surface of an inspection target.
Figure 2B:
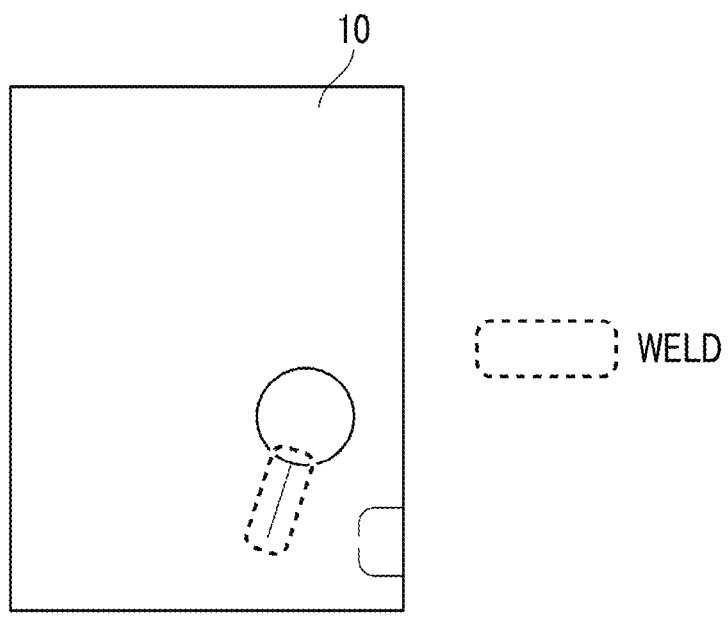

FIGS. 2A and 2B are diagrams illustrating an example of defects appearing on the surface of the inspection target 10. FIG. 2A shows an example of sink marks, and FIG. 2B shows an example of a weld. In FIGS. 2A and 2B, the defective portion is surrounded by a broken line. There are four sink marks in FIG. 2A.

The surface inspection apparatus 1 according to the present exemplary embodiment is used not only for inspection of defects and texture, but also for inspection of surface stains.

The surface inspection apparatus 1 quantifies a result of evaluating defects on the surface and the texture of the inspection target 10 to output the result.

The defects herein are unevenness and streaks appearing in the portion that should be flat, that is, sink marks and welds. The texture is evaluated by a numerical value (hereinafter also referred to as a "score"). The score is an example of a numerical value representing the quality of the surface of the inspection target 10.

For example, multivariate analysis is used to calculate the score. In multivariate analysis, for example, features appearing in the luminance distribution are analyzed. An example of a feature includes a streaky pattern extending along a direction of the sink mark, for example.

In addition, there is also a method of using artificial intelligence to calculate the score. For example, the score of a partial region within the inspection range is calculated by giving the image captured by the camera to a learning model obtained by deep machine learning of the relationship between the image of the defect and the score.

The inspection target 10 shown in FIG. 1 is installed parallel to the planes defined by an X axis and a Y axis. In this case, the normal of the surface of the inspection target 10 is parallel to a Z axis.

On the other hand, the surface inspection apparatus 1 is arranged vertically above the inspection target 10. In other words, an optical axis of an optical system used by the surface inspection apparatus 1 for imaging the inspection target 10 is set substantially parallel to the normal of the surface of the inspection target 10. Hereinafter, the conditions required for this optical axis are also referred to as "imaging conditions".

In this case, the surface inspection apparatus 1 is installed at a position that satisfies the imaging conditions. The surface inspection apparatus 1 may be installed by fixing the surface inspection apparatus to a specific member, or may be detachably attached to the specific member.

However, the surface inspection apparatus 1 may be a portable apparatus. In a case where the surface inspection apparatus is portable, an operator inspects any surface by, for example, holding the surface inspection apparatus 1 in his/her hand and directing the light receiving surface toward the inspection target 10.

In FIG. 1, for the purpose of describing the positional relationship between the surface inspection apparatus 1 and the inspection target 10, the appearance of the surface inspection apparatus 1 is simplified and represented as a substantially rectangular parallelepiped.

Configuration of Surface Inspection Apparatus

Figure 3:
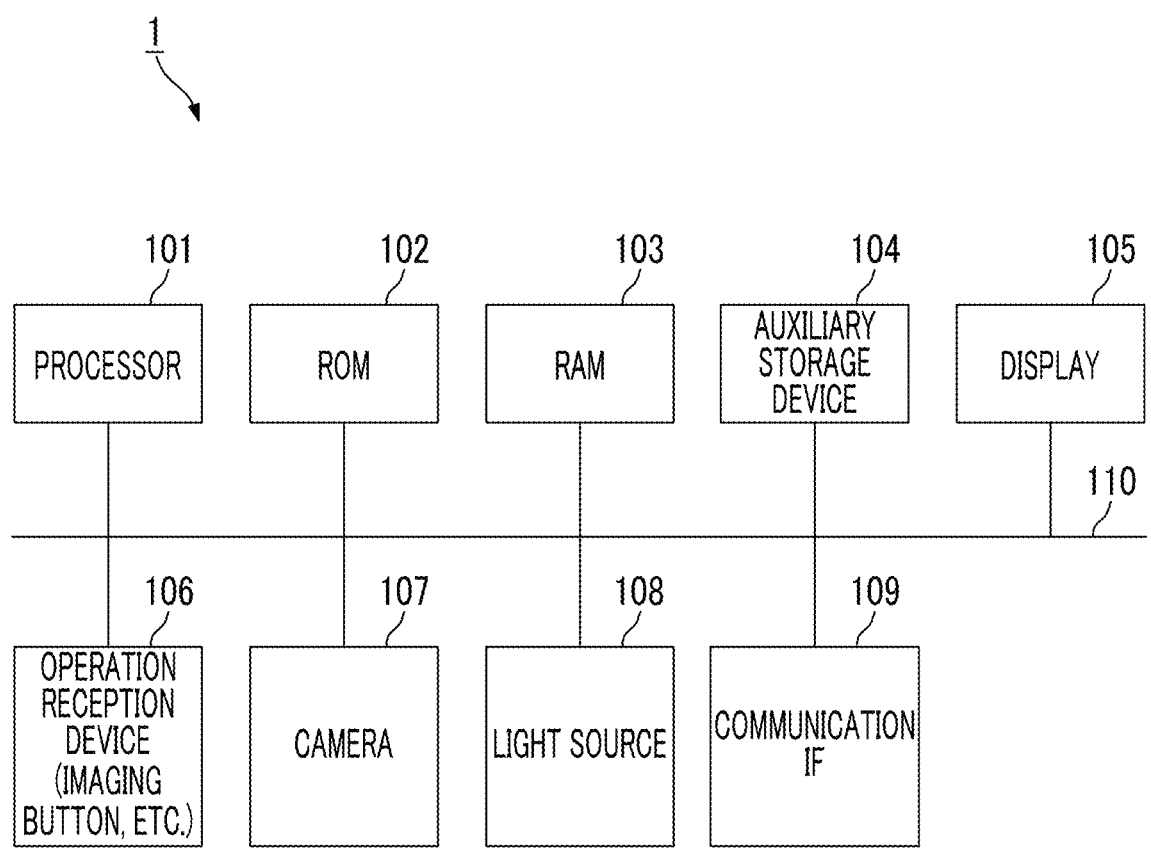
FIG. 3 is a diagram illustrating an example of a hardware configuration of the surface inspection apparatus used in the first exemplary embodiment.

FIG. 3 is a diagram illustrating an example of a hardware configuration of the surface inspection apparatus 1 used in the first exemplary embodiment.

The surface inspection apparatus 1 shown in FIG. 3 includes a processor 101 that controls the operation of the entire apparatus, a read only memory (ROM) 102 in which a basic input output system (BIOS) and the like are stored, a random access memory (RAM) 103 used as a work area of the processor 101, an auxiliary storage device 104 in which programs and image data are stored, a display 105 that displays a captured image of the surface of the inspection target 10 or information on operations, an operation reception device 106 that receives operations of an operator, a camera 107 that images the surface of the inspection target 10, a light source 108 that illuminates the surface of the inspection target 10, and a communication interface (IF) 109 used for communication with the outside. The processor 101 and each part are connected to each other through a signal line 110 such as a bus.

The processor 101, the ROM 102, and the RAM 103 function as so-called computers.

The processor 101 realizes various functions through the execution of a program. For example, the processor 101 performs the calculation or the like of the score for evaluating the texture of the imaged surface of the inspection target 10 through the execution of the program.

Image data obtained by imaging the surface of the inspection target 10 is stored in the auxiliary storage device 104. For the auxiliary storage device 104, for example, a semiconductor memory or a hard disk device is used. Firmware and application programs are also stored in the auxiliary storage device 104. In the following, firmware and application programs are collectively referred to as a "program".

The program that realizes the functions described in the present exemplary embodiment and other exemplary embodiments which will be described later can be provided not only by a communication unit but also by storing the program in a recording medium such as a CD-ROM.

The display 105 is, for example, a liquid crystal display or an organic EL display, and displays an image of the entire inspection target 10 or a specific portion of the inspection target 10. The display 105 is also used for positioning the imaging range with respect to the inspection target 10.

In the case of the present exemplary embodiment, the display 105 is integrally provided in the main body of the surface inspection apparatus, but may be an external device connected through the communication IF 109 or a part of another device connected through the communication IF 109. For example, the display 105 may be a display of another computer connected through the communication IF 109.

The operation reception device 106 is configured with a touch sensor arranged on the display 105, physical switches and buttons arranged on a housing, and the like.

In the case of the present exemplary embodiment, a power button and an imaging button are provided as an example of physical buttons. In a case where the power button is operated, for example, the light source 108 is turned on and the imaging by the camera 107 is started. Further, in a case where the imaging button is operated, a specific image captured by the camera 107 at the time of operation is acquired as an image for inspection.

A device that integrates the display 105 and the operation reception device 106 is called a touch panel. The touch panel is used to receive operations of a user on keys displayed in software (hereinafter also referred to as "soft keys").

In the case of the present exemplary embodiment, a color camera is used as the camera 107. For the image sensor of the camera 107, for example, a charge coupled device (CCD) imaging sensor element or a complementary metal oxide semiconductor (CMOS) imaging element is used.

Since a color camera is used as the camera 107, it is possible in principle to observe not only the luminance of the surface of the inspection target 10 but also the color tone. The camera 107 is an example of an imaging device.

In the case of the present exemplary embodiment, a white light source is used as the light source 108. The white light source generates light in which light in a visible light band is evenly mixed.

In the case of the present exemplary embodiment, a parallel light source is used as the light source 108. Further, a telecentric lens is arranged on the optical axis of the camera 107.

The light source 108 in the present exemplary embodiment is arranged at an angle at which the light component specular-reflected on the surface of the inspection target 10 is mainly incident on the camera 107.

The communication IF 109 is configured with a module conforming to a wired or wireless communication standard. For the communication IF 109, for example, an Ethernet (registered trademark) module, a universal serial bus (USB), a wireless LAN, or the like is used.

Structure of Optical System

Figure 4A:
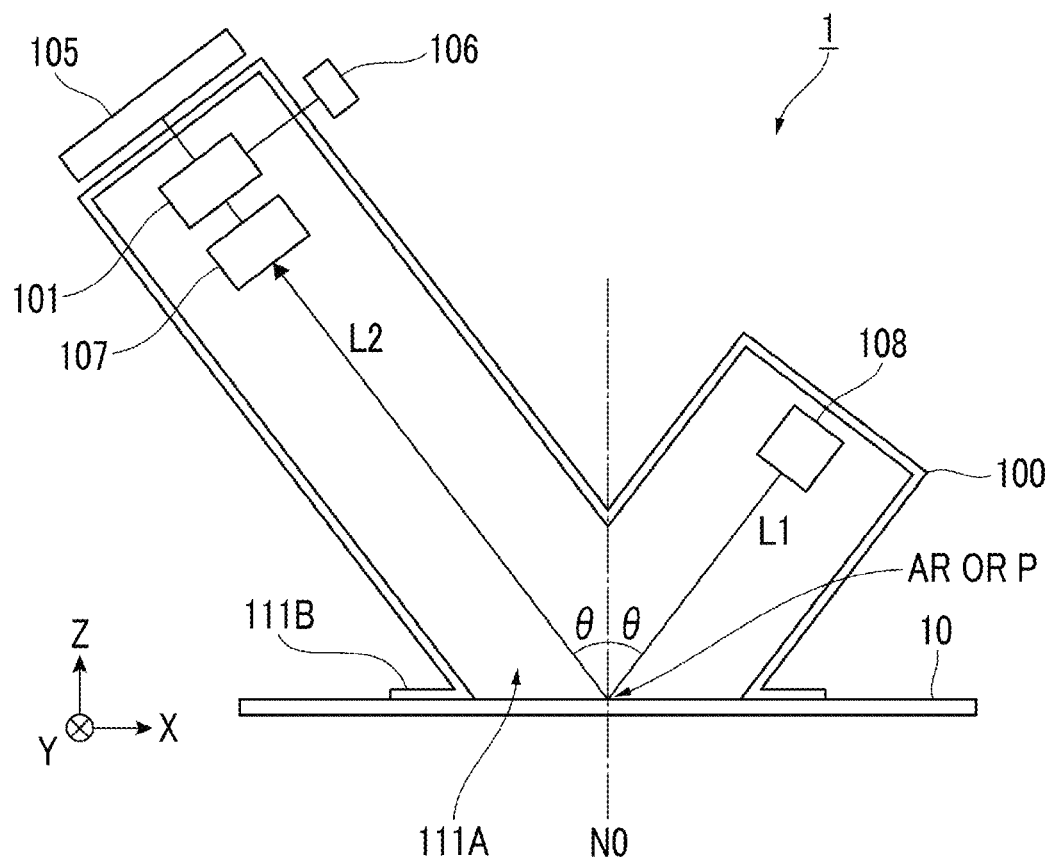
Figure 4B:
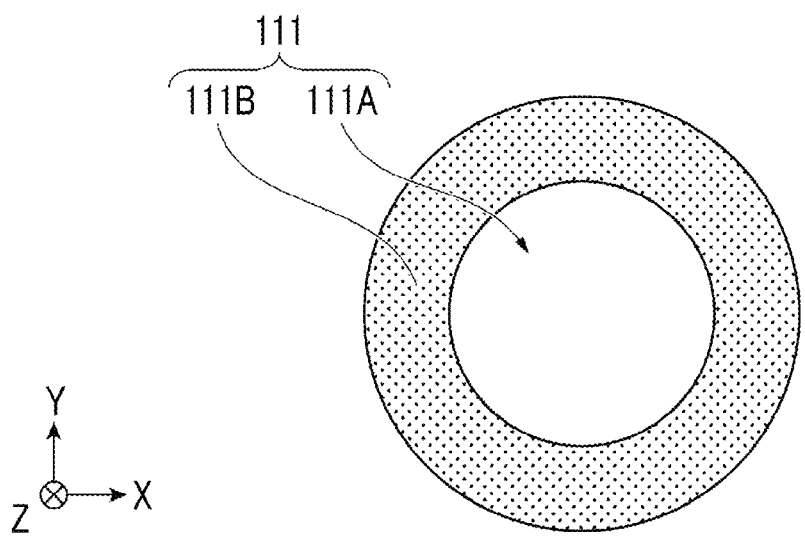

FIGS. 4A and 4B are diagrams illustrating a structural example of an optical system of the surface inspection apparatus 1 according to the first exemplary embodiment. FIG. 4A shows schematically an internal structure of a housing 100 of the surface inspection apparatus 1, and FIG. 4B shows a structure of an opening portion 111 pressed against the surface of the inspection target 10 at the time of inspection.

The opening portion 111 is provided with an opening 111A into which illumination light illuminating the surface of the inspection target 10 and reflected light reflected by the surface of the inspection target 10 are input/output, and a flange 111B surrounding an outer edge of the opening 111A.

In the case of FIGS. 4A and 4B, both the opening 111A and the flange 111B have a circular shape. However, the opening 111A and the flange 111B may have other shapes. For example, the opening 111A and the flange 111B may have a rectangular shape.

The opening 111A and the flange 111B do not have to have similar shapes, the opening 111A may have a circular shape, and the flange 111B may have a rectangular shape.

The flange 111B is used for positioning the surface inspection apparatus 1 in an imaging direction with respect to the surface of the inspection target 10. In other words, the flange 111B is used for positioning the camera 107 and the light source 108 with respect to the surface to be inspected. The flange 111B also serves to prevent or reduce the incident of external light or ambient light on the opening 111A.

The housing 100 shown in FIG. 4A has a structure in which two members having a substantially tubular shape are connected, and the light source 108 is attached to one member side, and the camera 107 and the processor 101 are attached to the other member side.

Further, the display 105 and the operation reception device 106 are attached to the side surface of the housing 100 on the side where the camera 107 is attached.

An imaging lens (not shown) is arranged on the optical axis of the camera 107 shown in FIG. 4A.

In the case of FIG. 4A, in the flat plate-shaped inspection target 10, the normal of the surface of the inspection target 10 is indicated by N0. Further, in FIG. 4A, the optical axis of the illumination light output from the light source 108 is indicated by L1, and the optical axis of the reflected light specular-reflected on the surface of the inspection target 10 is indicated by L2. The optical axis L2 herein coincides with the optical axis of the camera 107.

The surface of the actual inspection target 10 has structural or design unevenness, curved surfaces, steps, joints, fine unevenness formed in the molding process, and the like.

Therefore, as the normal N0 of the inspection target 10, an average value of the normal N0 of a region AR of interest in the inspection target 10 or the normal N0 of a specific position P of interest may be used.

Further, as the normal line N0 of the inspection target 10, the normal line N0 of the average virtual surface or the representative portion of the inspection target 10 may be used.

In the case of FIG. 4A, the optical axis L1 of the illumination light output from the light source 108 and the optical axis L2 of the camera 107 are both attached at an angle θ with respect to the normal line N0. For the angle θ, for example, approximately 30° or approximately 45° is used.

The sensitivity of detection by the surface inspection apparatus 1 used in the present exemplary embodiment is anisotropic.

Specifically, in a case where the surface inspection apparatus 1 is arranged as shown in FIG. 4A, the sensitivity to detect a linear pattern extending in a Y-axis direction (hereinafter referred to as a "linear pattern") is high, and the sensitivity to detect a linear pattern extending in an X-axis direction is low. In other words, the sensitivity to detect a linear pattern extending in a direction orthogonal to the virtual surface defined by the optical axis L1 of the light source 108 and the optical axis L2 of the camera 107 is high, and the sensitivity to detect a linear pattern extending in a direction parallel to the virtual surface is low.

Relationship Between Direction in which Detection Sensitivity is High and Direction of Linear Pattern Here, the relationship between the direction in which the detection sensitivity is high and the direction of the linear pattern to be inspected will be described.

Figure 5:
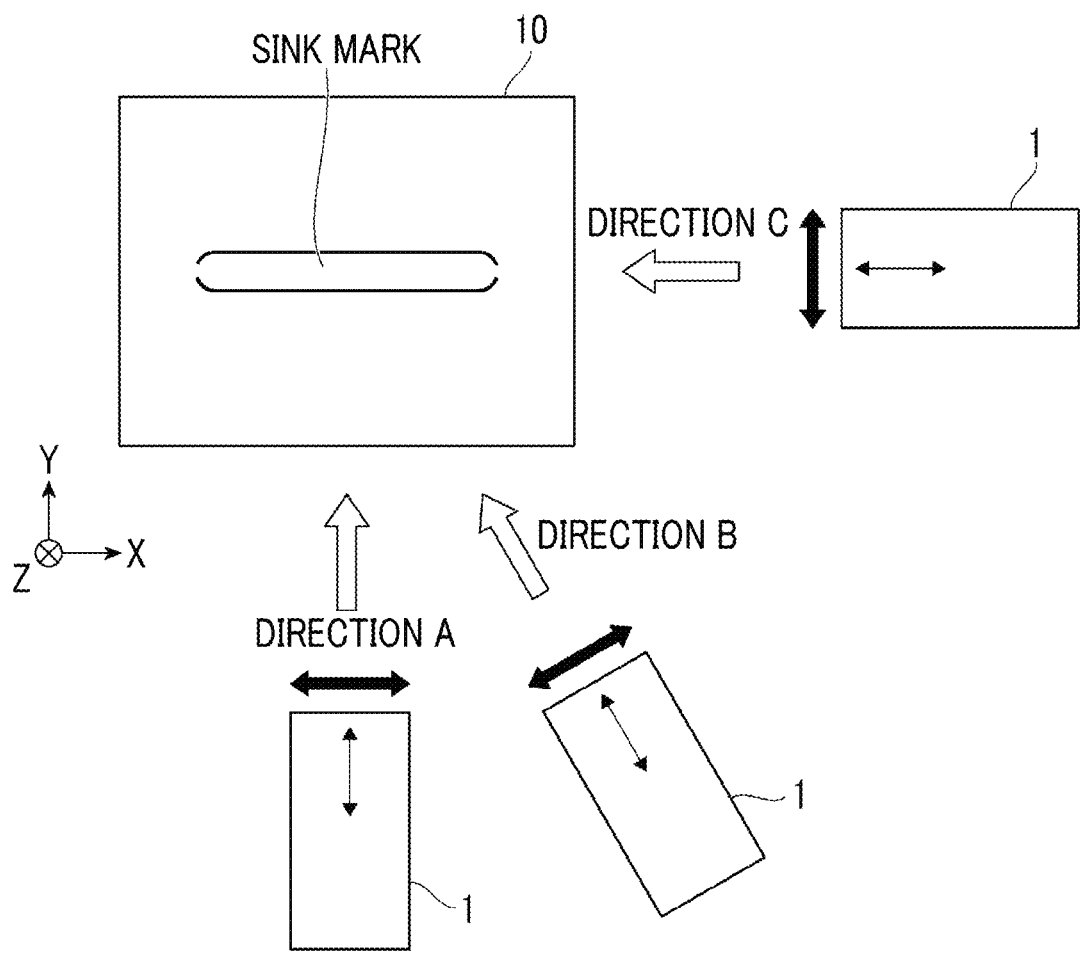
FIG. 5 is a diagram illustrating a direction of imaging by the surface inspection apparatus and a direction of a sink mark formed on the inspection target.

FIG. 5 is a diagram illustrating a direction of imaging by the surface inspection apparatus 1 and a direction of a sink mark formed on the inspection target 10. In FIG. 5, the sink mark is exaggerated for convenience of description.

In the case of FIG. 5, the direction of the sink mark is parallel to the X axis. The direction of the sink mark is an example of a first orientation.

The direction in which the sensitivity of detection by the surface inspection apparatus 1 is high is a direction orthogonal to a plane defined by the optical axis L1 of an illumination system and the optical axis L2 of an imaging system. In other words, the direction in which the sensitivity of detection by the surface inspection apparatus 1 is high is the direction orthogonal to the direction of imaging. The direction in which the detection sensitivity is high is an example of a second orientation.

In the case of FIG. 5, the direction in which the inspection target 10 is imaged in parallel with the Y axis is defined as a "direction A".

The direction in which the inspection target 10 is imaged obliquely with respect to the Y axis is defined as a "direction B". In the case of FIG. 5, the angle of the imaging direction with respect to the Y axis is approximately 30°.

The direction in which the inspection target 10 is imaged in parallel with the X axis is defined as a "direction C". The direction in which the sink mark extends when viewed in the "direction C" coincides with the direction in which the sensitivity of detection by the surface inspection apparatus 1 is low.

Figure 6A:
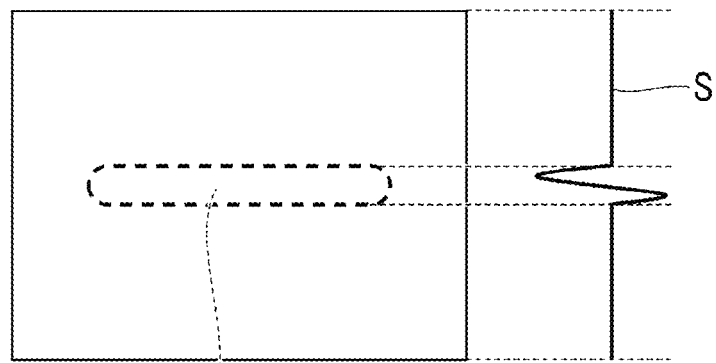
Figure 6B:
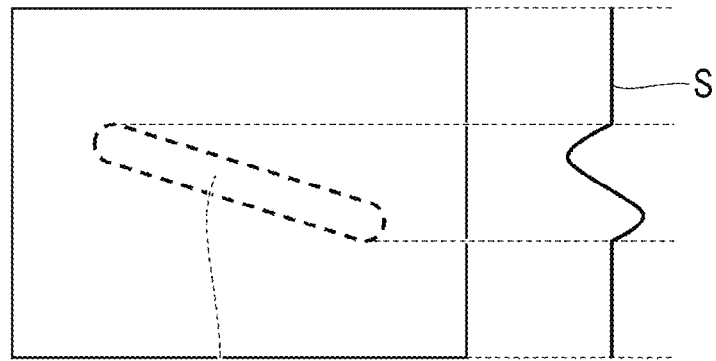
Figure 6C:
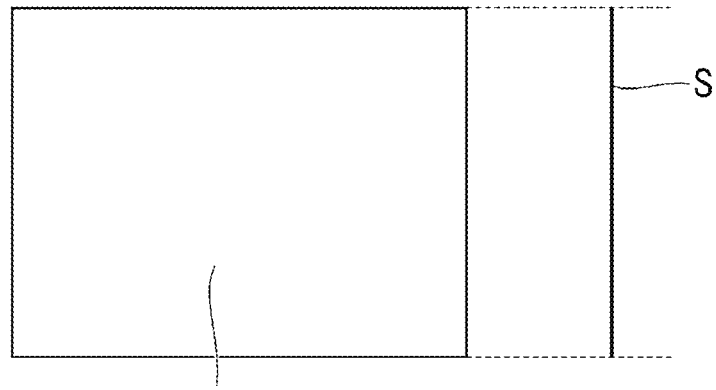

FIGS. 6A to 6C are diagrams illustrating a relationship between the direction of imaging and a luminance profile S generated from a captured image. FIG. 6A shows the luminance profile S in a case where the image is captured in the "direction A", FIG. 6B shows the luminance profile S in a case where the image is captured in the "direction B", and FIG. 6C shows the luminance profile S in a case where the image is captured in the "direction C".

In the case of FIGS. 6A to 6C, from the image captured in the direction A in which the direction in which the detection sensitivity is high and the direction of the sink mark coincide, the luminance profile S having a high wave height reflecting a luminance difference generated in the sink mark portion is detected.

From the image captured in the direction B, which is oblique to the direction in which the detection sensitivity is high and the direction of the sink mark, the luminance profile S having a low wave height reflecting a luminance difference generated in the sink mark portion is detected.

In a case where the inspection target 10 is imaged in the direction C, the direction in which the sink mark extends is the direction in which the detection sensitivity is low. Therefore, the captured image also contains almost no difference in luminance due to the sink mark. Therefore, the luminance profile S has a substantially flat waveform.

For the above reasons, it can be seen that in order to correctly evaluate the quality of the surface of the inspection target 10, for example, it is advisable to capture an image in the direction A with respect to the direction of the sink mark.

In the following, the case of calculating the score from the luminance profile S will be described, but also in the case of calculating the score by multivariate analysis of the image or in the case of calculating the score using artificial intelligence, for example, it is advisable to capture an image from a position close to the "direction A" in which the unevenness of the surface is easily imaged as a difference in luminance.

Inspection Operation

FIG. 7 is a flowchart illustrating an example of an inspection operation by the surface inspection apparatus 1 used in the first exemplary embodiment. The symbol S shown in the figure means a step.

The process shown in FIG. 7 is implemented through the execution of the program by the processor 101 (see FIG. 3).

In the surface inspection apparatus 1 according to the present exemplary embodiment, the light source 108 (see FIGS. 4A and 4B) is turned on by operating the power button, and the imaging by the camera 107 (see FIGS. 4A and 4B) is started. The captured image is displayed on the display 105 (see FIGS. 4A and 4B).

Figure 8:
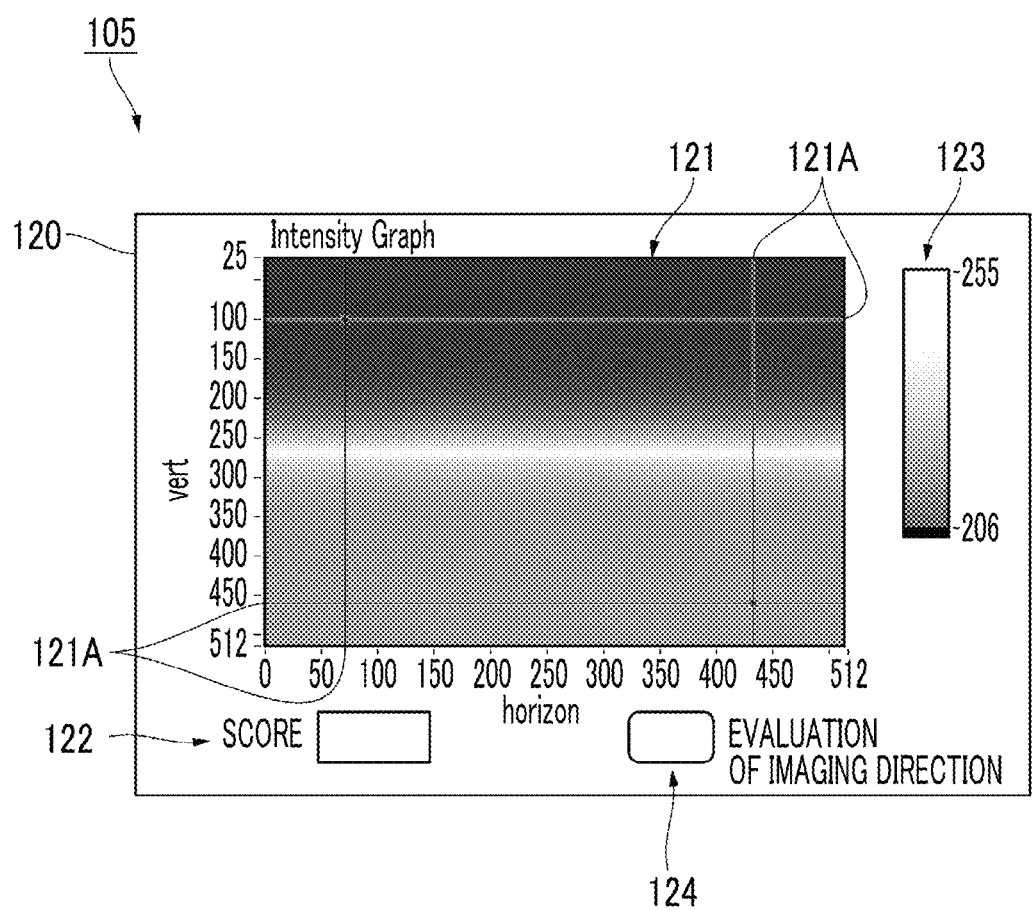
FIG. 8 is a diagram illustrating an example of an operation screen displayed on a display.

FIG. 8 is a diagram illustrating an example of an operation screen 120 displayed on the display 105. On the operation screen 120 shown in FIG. 8, a display field of an image (hereinafter referred to as a "captured image field") 121 captured by the camera 107, a score field 122, a legend 123, and an information field 124 indicating a positional relationship between a linear pattern and a direction of imaging (hereinafter referred to as "imaging direction") are arranged.

In the captured image field 121, a distribution of luminance values, that is, a grayscale image is displayed. In the case of FIG. 8, a reference line 121A that gives the outer edge of the inspection range used for the calculation of the score is displayed.

In the example of FIG. 8, the range surrounded by the four reference lines 121A is the inspection range. For images within the inspection range, a score representing the quality of the surface is calculated.

The legend 123 is shown on the right side of the captured image field 121. In the case of FIG. 8, the shading of the captured image field 121 corresponds to the gradation values "206" to "255".

In the case of the operation screen 120 shown in FIG. 8, since the score has not been calculated yet, the score field 122 is blank. Similarly, the display color of the information field 124 is gray. Gray is an example.

FIG. 7 is referred to again for description.

In the present exemplary embodiment, in a case where an operator checking the image displayed on the display 105 operates the imaging button, the image used for evaluating the quality of the surface is determined.

Therefore, the processor 101, which has started the inspection operation by operating the power button, determines whether or not the operation of the imaging button has been received (step S1). The operation of the operation button is an example of the operation of giving an instruction to start an inspection.

While a negative result is obtained in step S1, the processor 101 repeats the determination in step S1.

In a case where a positive result is obtained in step S1, the processor 101 acquires an image to be used for inspection (step S2). Specifically, the image displayed on the display 105 at the time when the imaging button is operated is acquired.

In the case of the present exemplary embodiment, in a case where the imaging button is operated, the update of the image displayed in the captured image field 121 (see FIG. 8) is stopped even though the imaging by the camera 107 is continued.

Next, the processor 101 calculates the score using the luminance profile S within the inspection range (step S3). That is, the score is calculated for the image within the range surrounded by the four reference lines 121A displayed in the captured image field 121.

Figure 9:
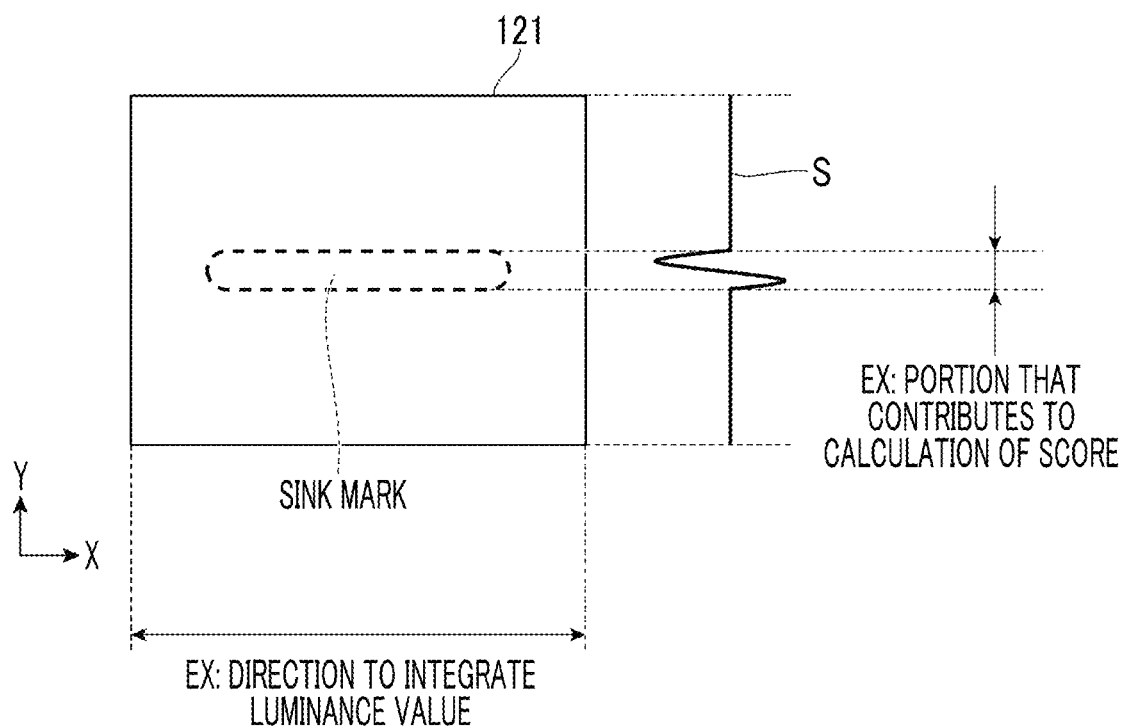
FIG. 9 is a diagram illustrating a principle of score calculation.

FIG. 9 is a diagram illustrating a principle of score calculation. The image shown in the captured image field 121 in FIG. 9 assumes a case where the sink mark is imaged from the "direction A".

In this case, the luminance profile S is given as a change in a luminance value (hereinafter referred to as a "representative luminance value") representing each coordinate in the Y-axis direction.

The representative luminance value herein is given as an integral value of the luminance values of the pixels having an identical Y coordinate. The convex waveform of the luminance profile S shows a bright region as compared with the surroundings, and the concave waveform of the luminance profile S shows a dark region as compared with the surroundings.

The score is calculated as, for example, a difference between the maximum value and the minimum value of the luminance profile S (that is, the wave height).

The score depends on the width, height, depth, number, etc. of the unevenness formed on the surface. For example, even though the height of the convex portion and the depth of the concave portion are identical, the score of the partial region where the convex portion or the concave portion having a longer width is formed becomes high.

Further, even though the widths of the convex portion and the concave portion are identical, the score of the partial region where the higher convex portion and the deeper concave portion are formed becomes high. In the case of the present exemplary embodiment, a high score means poor quality.

In the present exemplary embodiment, the partial region that contributes to the calculation of the score is defined as a space between the start point of the convex waveform and the end point of the concave waveform of the luminance profile S.

FIG. 7 is referred to again for description.

In a case where the score is calculated, the processor 101 displays the corresponding score on the operation screen 120 (step S4).

Next, the processor 101 detects the main orientation of the edge component from the features of the partial region having a high score (step S5).

In the case of the present exemplary embodiment, the processor 101 extracts a specific periodic component appearing in a specific direction in the partial region as an edge component. For the extraction of periodic components, for example, two-dimensional DCT (=Discrete Cosine Transform), DST (=Discrete Sine Transform), FFT (=Fast Fourier Transform), and the like are used.

Further, the processor 101 sets, for example, the average of the directions of the plurality of extracted edge components and the direction of the longest edge component as the main orientation of the edge components extracted from the inspection range.

Next, the processor 101 calculates the angle formed by the detected orientation and the orientation in which the sensitivity of detection by the camera 107 is high (step S6). For example, in the case of FIG. 9, the angle formed by the main direction of the edge component such as the sink mark and the X-axis direction is calculated.

After that, the processor 101 notifies the operator of information evaluating the current imaging direction according to the calculated size of the formed angle, and ends the process (step S7).

For example, the processor 101 evaluates the imaging direction in three stages. The three stages are an example, and may be two stages or four or more stages.

In the present exemplary embodiment, in a case where the formed angle is 0° or more and less than 22.5°, the processor 101 determines that the imaging direction is "good" and sets the display color of the information field 124 indicating the positional relationship to "green".

In a case where the formed angle is 22.5° or more and less than 45°, the processor 101 determines that the imaging direction is "slightly good" and sets the display color of the information field 124 indicating the positional relationship to "yellow".

In a case where the formed angle is 45° or more and 90° or less or the formed angle cannot be calculated, the processor 101 determines that the imaging direction is "re-imaging required" and sets the display color of the information field 124 indicating the positional relationship to "red".

Two threshold values are used for these determinations. In the case of this example, 22.5° is used as a threshold value for distinguishing between "good" and "slightly good". Further, 45° is used as a threshold value for distinguishing between "slightly good" and "re-imaging required". The angles that give these threshold values are examples.

Example of Information Notification

Figure 10A:
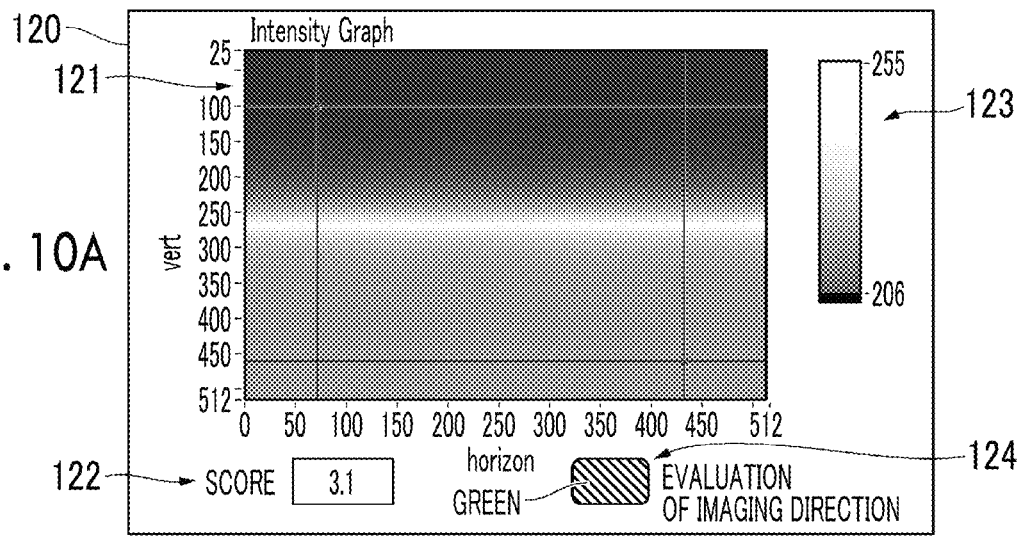
Figure 10B:
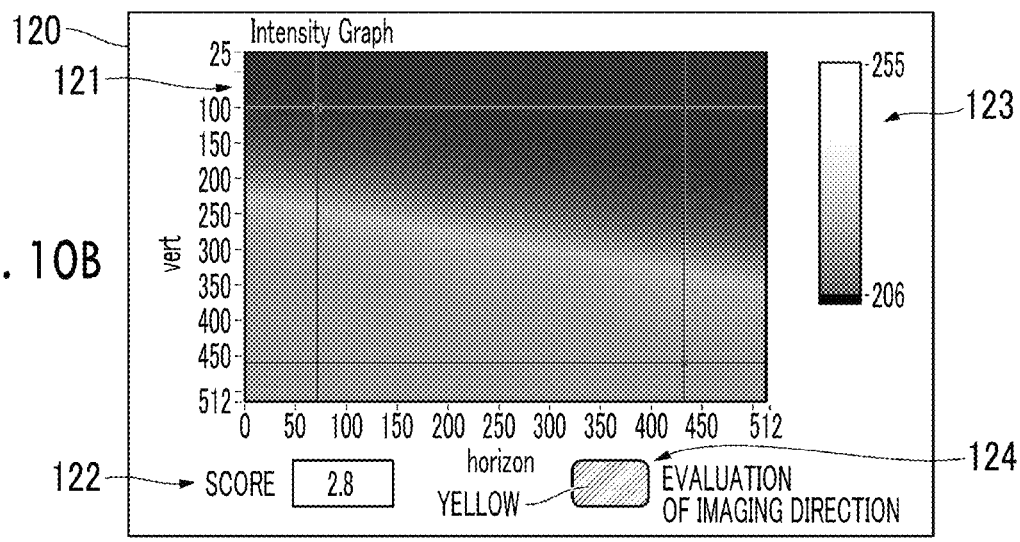
Figure 10C:
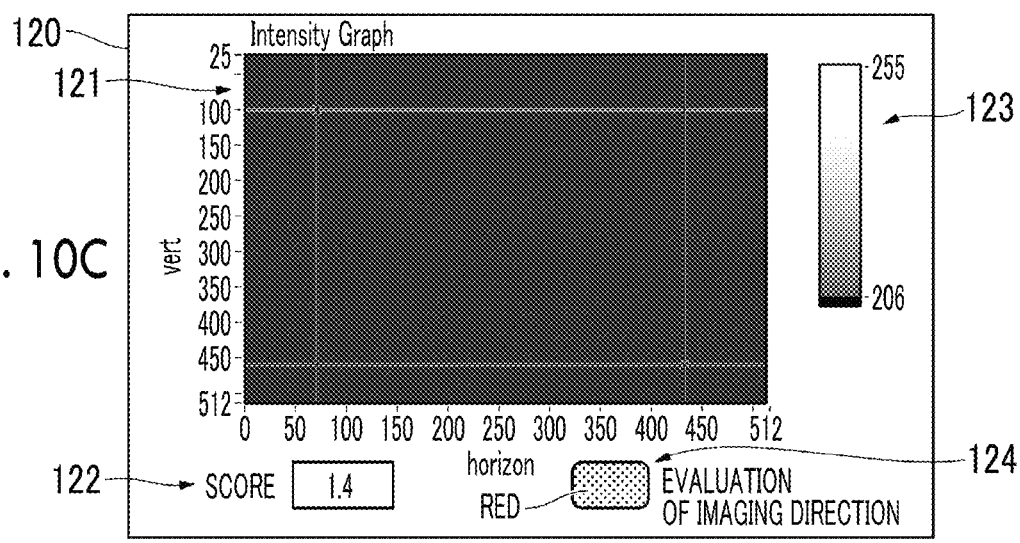

FIGS. 10A to 10C are diagrams illustrating an example of notification of an evaluation result of an imaging direction using the information field 124 indicating a positional relationship. FIG. 10A is an example of notification in a case where the sink mark to be inspected is imaged from the "direction A", FIG. 10B is an example of notification in a case where the sink mark to be inspected is imaged from the "direction B", and FIG. 10C is an example of notification in a case where the sink mark to be inspected is imaged from the "direction C".

In the case of FIG. 10A in which the imaging direction is determined to be "good" with respect to the sink mark direction, the information field 124 indicating the positional relationship is displayed in green.

In the case of FIG. 10B in which the imaging direction is determined to be "slightly good" with respect to the sink mark direction, the information field 124 indicating the positional relationship is displayed in yellow.

In the case of FIG. 10C in which the imaging direction is determined to be "re-imaging required" with respect to the sink mark direction, the information field 124 indicating the positional relationship is displayed in red. In fact, in FIG. 10C, the luminance distribution in the captured image field 121 is substantially uniform.

This means that the sink mark recognized by the operator is not recognized by the surface inspection apparatus 1. In the case of FIG. 10C, since the formed angle cannot be calculated, the information field 124 indicating the positional relationship is displayed in red.

The operator who sees these displays can notice that the current imaging direction is unsuitable for imaging and evaluating defects such as sink marks of interest. Further, by changing the imaging direction and re-imaging the sink mark or the like of interest, it is possible to calculate a score with higher reliability.

Second Exemplary Embodiment

In the present exemplary embodiment, some notification methods of notifying the operator of information obtained by evaluating the size of the formed angle calculated in step S6 (see FIG. 7) without using the information field 124 indicating the positional relationship will be described. Specifically, a notification method of the numerical value of the formed angle as it is and a notification method of the result of evaluating the formed angle by using figures, sounds, text, and the like will be described.

The appearance configuration and processing operation of the surface inspection apparatus 1 according to the present exemplary embodiment are basically identical to the appearance configuration and processing operation of the surface inspection apparatus 1 described in the first exemplary embodiment.

Example of Information Notification

Notification Example 1

Figure 11A:
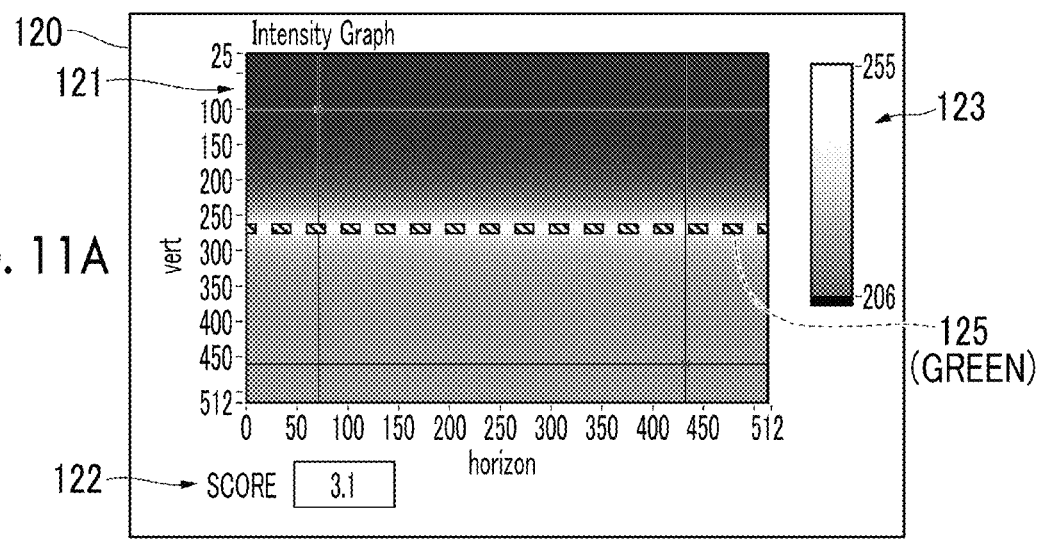
Figure 11B:
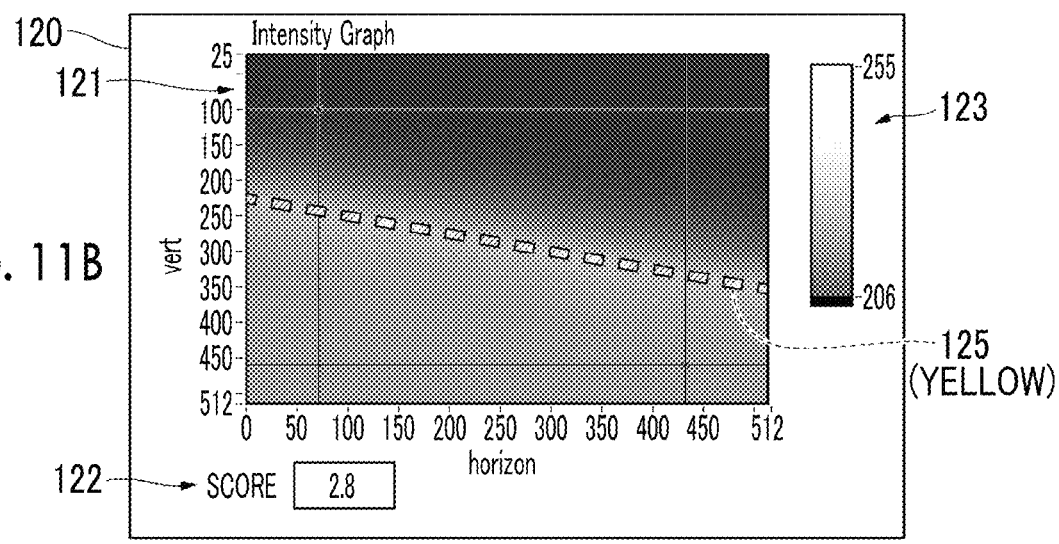
Figure 11C:
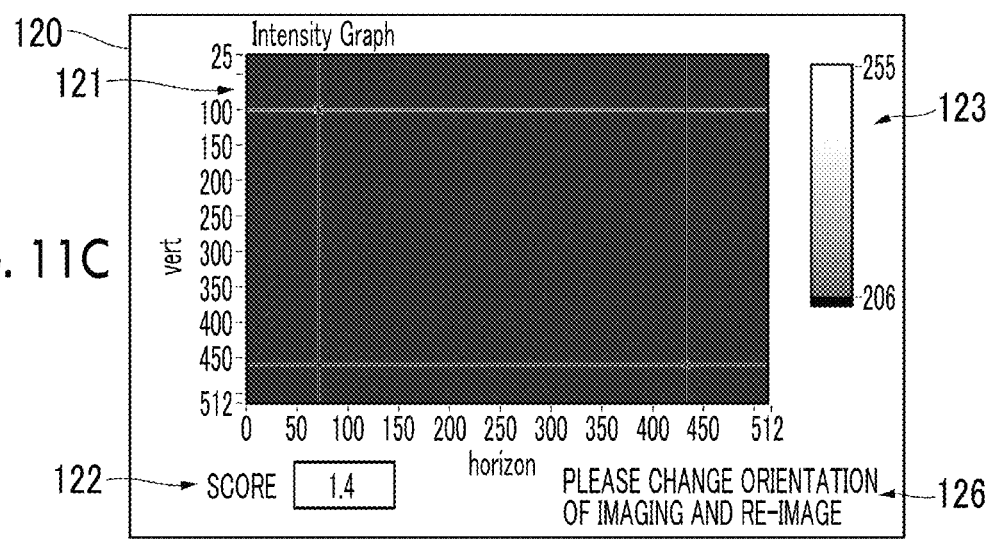

FIGS. 11A to 11C are diagrams illustrating an example of notification of the evaluation result using an auxiliary line 125 indicating a direction of a detected edge. FIG. 11A is an example of notification in a case where the sink mark to be inspected is imaged from the "direction A", FIG. 11B is an example of notification in a case where the sink mark to be inspected is imaged from the "direction B", and FIG. 11C is an example of notification in a case where the sink mark to be inspected is imaged from the "direction C".

In the case of FIG. 11A in which the imaging direction is determined to be "good" with respect to the sink mark direction, the green auxiliary line 125 indicating the direction of the extracted main edge is combined and displayed in the captured image field 121.

The auxiliary line 125 may be displayed on a screen prepared separately from the captured image field 121. The same applies to other display colors.

Further, although the colored auxiliary line 125 representing the evaluation result is displayed in FIG. 11A, as the auxiliary line 125, a specific color determined independently of the evaluation result, for example, a white or red auxiliary line 125 may be used.

Further, in the case of FIG. 11B in which the imaging direction is determined to be "slightly good" with respect to the sink mark direction, the yellow auxiliary line 125 indicating the direction of the extracted main edge is combined and displayed in the captured image field 121.

In the case of FIG. 11C in which the imaging direction is determined to be "re-imaging required" with respect to the sink mark direction, a caution statement 126 such as "Please change the orientation of imaging and re-image" is displayed in the margin of the captured image field 121. By displaying the evaluation result in text, the operator can notice that the imaging direction is unsuitable for imaging defects such as sink marks of interest.

Notification Example 2

FIGS. 12A to 12C are diagrams illustrating an example of notification of the evaluation result using an indicator 127. FIG. 12A is an example of notification in a case where the sink mark to be inspected is imaged from the "direction A", FIG. 12B is an example of notification in a case where the sink mark to be inspected is imaged from the "direction B", and FIG. 12C is an example of notification in a case where the sink mark to be inspected is imaged from the "direction C".

The indicator 127 shown in FIGS. 12A to 12C is given as a bar graph and a display range of the bar corresponds to 0° to 90°. The size of the formed angle is displayed at the position of the needle tip.

In the case of FIGS. 12A to 12C, in the indicator 127 ranges corresponding to the three evaluations of "good", "slightly good", and "re-imaging required" are displayed in green, yellow, and red colors.

Also in the case of FIG. 12A, the "good" range is given at 0° or more and less than 22.5°, the "slightly good" range is given at 22.5° or more and less than 45°, and the "re-imaging required" range is given at 45° or more and 90° or less.

In the case of FIG. 12A, the formed angle is about 11°. Therefore, the needle tip points to the vicinity of the center of the green range of the indicator 127.

In the case of FIG. 12B, the formed angle is about 30°. Therefore, the needle tip points to the left of the yellow range of the indicator 127.

In the case of FIG. 12C, the formed angle is about 80°. Therefore, the needle tip points to the vicinity of the right end of the red range of the indicator 127. In the case of the determination of "re-imaging required", it is considered that the accuracy of detecting the main orientation of the edge is also low. Therefore, in FIG. 12C, the text "estimated" is displayed on the right side of the needle tip, indicating that the position pointed by the needle tip is not always the exact angle.

In the case of the determination of "re-imaging required", the caution statement 126 (see FIGS. 11A to 11C) may be displayed separately from the indicator 127 or together with the indicator 127, as in the case of Notification example 1.

Further, in the case of Notification example 2, the calculated formed angle is indicated by the position of the needle tip of the indicator, but the calculated value of the formed angle may be displayed only by text. In that case, the display of the indicator 127 is unnecessary.

Further, in the case of the indicator 127 illustrated in FIGS. 12A to 12C, the difference in evaluation of the formed angle is expressed by the difference in color, but a bar graph that does not include the information on the difference in evaluation may be used. For example, a simple scale may be used.

Further, in the case of FIGS. 12A to 12C, the bar graph is used for displaying the indicator 127, but a semicircular graph may be used.

Notification Example 3

FIGS. 13A to 13C are diagrams illustrating an example of notification of a recommended direction of imaging using figures, text, and the like. FIG. 13A is an example of notification in a case where the sink mark to be inspected is imaged from the "direction A", FIG. 13B is an example of notification in a case where the sink mark to be inspected is imaged from the "direction B", and FIG. 13C is an example of notification in a case where the sink mark to be inspected is imaged from the "direction C".

In the case of FIG. 13A, the evaluation of the imaging direction is "good". Therefore, in a recommended imaging direction information field 128, a figure representing a circle and the sentence "good" are displayed. Further, in the case of FIG. 13A, the figure is displayed in green.

In the case of FIG. 13B, the evaluation of the imaging direction is "slightly good". Therefore, in the recommended imaging direction information field 128, an arrow-shaped figure indicating that the sink mark or the like to be evaluated should be imaged from the left side of the current position, and the sentence "slightly good" are displayed. Specifically, the arrow pointing to the upper right indicates the recommended imaging direction. Further, in the case of FIG. 13B, the figure is displayed in yellow.

In the case of FIG. 13C, the evaluation of the imaging direction is "re-imaging required". Therefore, in the recommended imaging direction information field 128, there is an arrow-shaped figure indicating that imaging should be performed to the right from a position rotated 90° clockwise from the current position, and the sentence "re-imaging required" are displayed. Further, in the case of FIG. 13C, the figure is displayed in red.

In the case of the determination of "re-imaging required", the caution statement 126 (see FIGS. 11A to 11C) may be displayed separately from the information field 128 or together with the information field 128, as in the case of Notification example 2. Coloring of figures is not always necessary.

Notification Example 4

FIGS. 14A to 14C are diagrams illustrating an example of notification of the evaluation result by a sound effect. FIG. 14A is an example of notification in a case where the sink mark to be inspected is imaged from the "direction A", FIG. 14B is an example of notification in a case where the sink mark to be inspected is imaged from the "direction B", and FIG. 14C is an example of notification in a case where the sink mark to be inspected is imaged from the "direction C".

In the case of FIG. 14A, the evaluation of the imaging direction is "good". Therefore, the surface inspection apparatus 1 gives a notification by a sound effect such as "ping, pong", for example.

In the case of FIG. 14B, the evaluation of the imaging direction is "slightly good". Therefore, the surface inspection apparatus 1 gives a notification by a sound effect such as "beep beep", for example.

In the case of FIG. 14C, the evaluation of the imaging direction is "re-imaging required". Therefore, the surface inspection apparatus 1 gives a notification by a sound effect such as "boo boo", for example.

Notification Example 5

FIGS. 15A to 15C are diagrams illustrating an example of notification of the evaluation result by voice. FIG. 15A is an example of notification in a case where the sink mark to be inspected is imaged from the "direction A", FIG. 15B is an example of notification in a case where the sink mark to be inspected is imaged from the "direction B", and FIG. 15C is an example of notification in a case where the sink mark to be inspected is imaged from the "direction C".

In the case of FIG. 15A, the evaluation of the imaging direction is "good". Therefore, the surface inspection apparatus 1 gives a notification by voice such as "The orientation of imaging is good", for example.

In the case of FIG. 15B, the evaluation of the imaging direction is "slightly good". Therefore, the surface inspection apparatus 1 gives a notification by voice such as "The orientation of imaging is tilted by 30° with respect to the best direction".

In the case of FIG. 15C, the evaluation of the imaging direction is "re-imaging required". Therefore, the surface inspection apparatus 1 gives a notification by a sound effect such as "The orientation of imaging is tilted by 45° or more with respect to the best direction".

Notification Example 6

FIGS. 16A to 16C are diagrams illustrating another example of notification of the evaluation result by voice. FIG. 16A is an example of notification in a case where the sink mark to be inspected is imaged from the "direction A", FIG. 16B is an example of notification in a case where the sink mark to be inspected is imaged from the "direction B", and FIG. 16C is an example of notification in a case where the sink mark to be inspected is imaged from the "direction C".

In the case of FIG. 16A, the evaluation of the imaging direction is "good". In this case, the change of the imaging direction is unnecessary. Therefore, in the case of FIG. 16A, the voice of giving an instruction of the correction of the imaging direction is not output.

In the case of FIG. 16B, the evaluation of the imaging direction is "slightly good". Therefore, the surface inspection apparatus 1 gives a notification by voice such as "Let's change the imaging position clockwise", for example.

In the case of FIG. 16C, the evaluation of the imaging direction is "re-imaging required". Therefore, the surface inspection apparatus 1 gives a notification by voice such as "The imaging direction does not seem to be correct. Please change the orientation and re-image.", for example.

Third Exemplary Embodiment

In the case of the present exemplary embodiment, a case where a display field of an image in which the features of the partial region used to calculate the score are emphasized (hereinafter referred to as an "emphasized image field") is displayed on the operation screen 120 will be described.

The appearance configuration and processing operation of the surface inspection apparatus 1 according to the present exemplary embodiment are identical to the appearance configuration and processing operation of the surface inspection apparatus 1 described in the first exemplary embodiment.

FIG. 17 is a flowchart illustrating an example of an inspection operation by the surface inspection apparatus 1 used in a third exemplary embodiment. In FIG. 17, portions corresponding to the portions in FIG. 7 are denoted by the corresponding reference numerals.

The process shown in FIG. 17 is implemented through the execution of the program by the processor 101 (see FIG. 3).

In the surface inspection apparatus 1 according to the present exemplary embodiment, the light source 108 (see FIGS. 4A and 4B) is turned on by operating the power button, and the imaging by the camera 107 (see FIGS. 4A and 4B) is started. The captured image is displayed on the display 105 (see FIGS. 4A and 4B).

FIG. 18 is a diagram illustrating an example of an operation screen 120 displayed on the display 105. In FIG. 18, portions corresponding to the portions in FIG. 8 are denoted by the corresponding reference numerals.

On the operation screen 120 shown in FIG. 18, in addition to the captured image field 121 of the image captured by the camera 107, the score field 122, the legend 123, and the information field 124 indicating the positional relationship, an emphasized image field 129 for displaying an image in which the features of a partial region that has contributed to the calculation of the score are emphasized is arranged.

In the case of the operation screen 120 shown in FIG. 18, since the score has not been calculated yet, no image is displayed in the emphasized image field 129.

FIG. 17 is referred to again for description.

In the present exemplary embodiment, in a case where an operator checking the image displayed on the display 105 operates the imaging button, the image used for evaluating the quality of the surface is determined.

Therefore, the processor 101, which has started the inspection operation by operating the power button, determines whether or not the operation of the imaging button has been received (step S1).

While a negative result is obtained in step S1, the processor 101 repeats the determination in step S1.

In a case where a positive result is obtained in step S1, the processor 101 acquires an image to be used for inspection (step S2). Specifically, the image displayed on the display 105 at the time when the imaging button is operated is acquired.

In the case of the present exemplary embodiment, in a case where the imaging button is operated, the update of the image displayed in the captured image field 121 (see FIG. 18) is stopped even though the imaging by the camera 107 is continued.

Next, the processor 101 calculates the score using the luminance profile within the inspection range (step S3). That is, the score is calculated for the image within the range surrounded by the four reference lines 121A displayed in the captured image field 121.

In a case where the score is calculated, the processor 101 displays the corresponding score on the operation screen 120 (step S4).

In the case where the score is calculated, the processor 101 generates an image in which the features of the partial region having a high score are emphasized (hereinafter referred to as an "emphasized image") and displays the generated image separately (step S11).

In the present exemplary embodiment, the processor 101 extracts a specific periodic component appearing in a specific direction from the extracted partial region, and generates an emphasized image by superimposing the feature image on the original image by the inverse transformation of the extracted periodic component.

In inverse transformation to the feature image, an intensity component (that is, a luminance value) of each pixel is normalized by the maximum value, and a gradation range of the feature image is expanded. In addition, by mapping a color component to the intensity component of the feature image, it is possible to distinguish the feature image from the original image portion expressed in gray scale.

By displaying the emphasized image, it is possible to check the surface state even in a case where it is difficult to visually recognize the minute structure in the grayscale image obtained by imaging the surface of the partial region where the score is calculated.

In the case of the present exemplary embodiment, the generated emphasized image is displayed side by side in the operation screen identical to the grayscale image captured by the camera 107.

Next, the processor 101 detects the main orientation of the edge component from the features of the partial region having a high score (step S5).

Subsequently, the processor 101 calculates the angle formed by the detected orientation and the orientation in which the sensitivity of detection by the camera 107 is high (step S6).

After that, the processor 101 notifies the operator of information evaluating the current imaging direction according to the calculated size of the formed angle, and ends the process (step S7).

Display Example

FIGS. 19A to 19C are diagrams illustrating a display example of the operation screen 120 including the emphasized image field 129. FIG. 19A is a display example in a case where the sink mark to be inspected is imaged from the "direction A", FIG. 19B is a display example in a case where the sink mark to be inspected is imaged from the "direction B", and FIG. 19C is a display example in a case where the sink mark to be inspected is imaged from the "direction C".

In FIGS. 19A to 19C, portions corresponding to the portions in FIGS. 10A to 10C are denoted by the corresponding reference numerals.

In the case of FIGS. 19A to 19C, an image in which the image in the inspection range is emphasized is displayed in the emphasized image field 129. Therefore, it is possible to observe a fine state of the inspection target 10 which is the target of imaging, not only in the case where the imaging direction is good but also in the case where the imaging direction is not good. The emphasized image field 129 herein is an example of a second image.

Fourth Exemplary Embodiment

In the case of the present exemplary embodiment, the surface inspection apparatus 1 (see FIG. 1) that does not require the operation of the imaging button in calculating the score will be described.

The appearance configuration and the like of the surface inspection apparatus 1 according to the present exemplary embodiment are identical to the appearance configuration and the like of the surface inspection apparatus 1 described in the first exemplary embodiment.

FIG. 20 is a flowchart illustrating an example of an inspection operation by the surface inspection apparatus 1 used in a fourth exemplary embodiment. In FIG. 20, portions corresponding to the portions in FIG. 7 are denoted by the corresponding reference numerals.

In the case of FIG. 20, in the processor 101 (see FIG. 3), the light source 108 (see FIGS. 4A and 4B) is turned on by operating the power button, the imaging by the camera 107 (see FIGS. 4A and 4B) is started, and the score calculation and the like are performed at the same time.

Therefore, in a case where the processor 101 acquires the image being captured by the camera 107 (step S21), the processor 101 calculates the score using the luminance profile within the inspection range (step S3).

Hereinafter, the processor 101 displays the corresponding score on the operation screen 120 (step S4).

Since the following processing operation is identical to the processing operation of the first exemplary embodiment, the description thereof will be omitted.

Fifth Exemplary Embodiment

In the present exemplary embodiment, an example in which a physical operator for changing the inspection range is arranged in the housing 100 (see FIGS. 4A and 4B) will be described.

FIG. 21 is a diagram illustrating a structural example of an optical system of a surface inspection apparatus 1A according to a fifth exemplary embodiment. In FIG. 21, portions corresponding to the portions in FIG. 1 are denoted by the corresponding reference numerals.

A so-called line camera is used for an imaging unit of the surface inspection apparatus 1A used in the present exemplary embodiment. Therefore, the imaging range is linear.

In the case of the present exemplary embodiment, at the time of inspection, an inspection target 10 is moved in the direction of the arrow while being installed on a uniaxial stage 20. By moving the uniaxial stage 20 in one direction, the entire inspection target 10 is imaged.

The positional relationship between a camera 107 (see FIGS. 4A and 4B) and a light source 108 (see FIGS. 4A and 4B) is identical to the positional relationship between the camera 107 and the light source 108 of the first exemplary embodiment, except that the line camera is used as the camera 107 (see FIGS. 4A and 4B). Meanwhile, in a case where a line camera is used as the camera 107, it is necessary to arrange an illumination 108 having a specular reflection component corresponding to each angle of view.

FIG. 22 is a diagram illustrating optical conditions required in a case where a line camera 107A is used. In the case of FIG. 22, illumination light is output in a plurality of directions from each position of an illumination 108A in which light emitting portions are arranged in a line, and one of the pieces of illumination light is specularly reflected on the surface of the inspection target 10 and incident on the line camera 107.

In the case of the area camera described above, the incident of the specular reflection component corresponding to each angle of view is ensured by devising the arrangement of the surface light source and the point light source or the like.

Other Exemplary Embodiments (1) Although the exemplary embodiments of the present invention have been described above, the technical scope of the present invention is not limited to the scope described in the above-described exemplary embodiments. It is clear from the description of the claims that the above-described exemplary embodiments with various modifications or improvements are also included in the technical scope of the present invention.

(2) In the above-described exemplary embodiments, a color camera is used as the camera 107 (see FIGS. 4A and 4B), but a monochrome camera may also be used. Further, the surface of the inspection target 10 (see FIG. 1) may be inspected using only the green (G) component of the color camera.

(3) In the above-described exemplary embodiments, a white light source is used as the light source 108 (see FIGS. 4A and 4B), but the illumination light may be any color.

Further, the illumination light is not limited to visible light, but may be infrared light, ultraviolet light, or the like.

(4) In the above-described exemplary embodiments, the surface inspection apparatus 1 (see FIG. 1) using one light source 108 (see FIGS. 4A and 4B) has been described, but the surface of the inspection target 10 is illuminated by using a plurality of light sources.

For example, two light sources may be used. In that case, one light source may be arranged at an angle at which a specular-reflected light component is mainly incident on the camera 107 (see FIGS. 4A and 4B), and the other light source may be arranged at an angle at which a diffusely reflected light component is mainly incident on the camera 107. In this case, the two light sources may be arranged on both sides of the optical axis of the camera 107, or may be arranged on one side with respect to the optical axis of the camera 107.

(5) In the above-described exemplary embodiments, a parallel light source is used as the light source 108 (see FIGS. 4A and 4B), but a point light source or a surface light source which is a non-parallel light source may be used. Further, a non-telecentric lens may be used on the optical axis of the camera 107 (see FIGS. 4A and 4B). In a case where a telecentric lens or parallel light is not used, the apparatus can be downsized and the cost can be reduced as compared with the surface inspection apparatus 1 (see FIG. 1) described in the exemplary embodiments. In a case where a telecentric lens or parallel light is not used, the illumination is arranged so that there is a specular reflection component corresponding to each angle of view of the camera's optical system.

(6) In the above-described exemplary embodiments, the processor 101 (see FIG. 3) of the surface inspection apparatus 1 (see FIG. 1) that images the inspection target 10 (see FIG. 1) realizes a function of evaluating the angle formed by the direction of the one-dimensional pattern present in the inspection target 10 and the orientation in which the sensitivity of detection by the camera 107 (see FIG. 3) is high, and notifying the operator of the evaluation result. However, an equivalent function may be realized by a processor of an external computer or server that acquires image data from the surface inspection apparatus 1.

(7) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A surface inspection apparatus comprising:
    an imaging device configured to image a surface of an object to be inspected; and
    a processor configured to:
        calculate a numerical value representing a quality of the surface by processing an image captured by the imaging device; and
        notify a user of information indicating a relationship between a first orientation of a pattern on the surface detected from the image and a second orientation that gives a direction of imaging in which a sensitivity of detection by the imaging device is high.

2. The surface inspection apparatus according to claim 1, wherein the direction in which the detection sensitivity is high is a direction orthogonal to a plane defined by an optical axis of an illumination system and an optical axis of an imaging system.

3. The surface inspection apparatus according to claim 2, wherein the pattern is a one-dimensional pattern.

4. The surface inspection apparatus according to claim 1, wherein the processor is configured to:
    notify the user of a size of an angle formed by the first orientation and the second orientation in a plurality of stages.

5. The surface inspection apparatus according to claim 4, wherein the processor is configured to:
    display a relationship between the size of the formed angle and the plurality of stages.

6. The surface inspection apparatus according to claim 1, wherein the processor is configured to:
    notify the user of a size of an angle formed by the first orientation and the second orientation.

7. The surface inspection apparatus according to claim 4, wherein the processor is configured to:
    in a case where the formed angle exceeds a threshold value, notify the user of a direction in which a main body of the surface inspection apparatus is to be moved with respect to a current position.

8. The surface inspection apparatus according to claim 5, wherein the processor is configured to:
    in a case where the formed angle exceeds a threshold value, notify the user of a direction in which a main body of the surface inspection apparatus is to be moved with respect to a current position.

9. The surface inspection apparatus according to claim 1, wherein the processor is configured to:
    notify the user of the information in association with the image obtained by imaging the surface.

10. The surface inspection apparatus according to claim 9, wherein the processor is configured to:
    notify the user of the relationship by a color change.

11. The surface inspection apparatus according to claim 9, wherein the processor is configured to:

combine and display a figure indicating the direction of the pattern detected from the image with the image.

12. The surface inspection apparatus according to claim 11, wherein the processor is configured to:
change a display form of the figure according to a size of an angle formed by the first orientation and the second orientation.

13. The surface inspection apparatus according to claim 9, wherein the processor is configured to:
combine and display a partial image extracted from the image by a filter that extracts the second orientation with the image obtained by imaging the object.

14. The surface inspection apparatus according to claim 13, wherein the processor is configured to:
extract a frequency component satisfying a predetermined condition from the image, and combine and display an emphasized component generated by an inverse transformation of the extracted frequency component as the partial image with the image obtained by imaging the object.

15. The surface inspection apparatus according to claim 14,
wherein a second image obtained by combining the emphasized component is displayed separately from the image obtained by imaging the object.

16. The surface inspection apparatus according to claim 1, wherein the processor is configured to:
in a case where the first orientation is not detected, notify the user that the pattern is not present on the surface.

17. The surface inspection apparatus according to claim 1, wherein the processor is configured to:
in a case where the first orientation is not detected during operation in a specific mode, notify the user that an orientation for imaging the surface is incorrect.

18. The surface inspection apparatus according to claim 1, wherein a main body of the surface inspection apparatus is portable.

19. A non-transitory computer readable medium storing a program causing a computer for processing an image captured by an imaging device to realize a function comprising:
acquiring a first orientation of a pattern on a surface of an object to be inspected, which is detected from the image obtained by imaging the surface; and
notifying a user of information indicating a relationship between a second orientation that gives a direction of imaging in which a sensitivity of detection by the imaging device is high and the first orientation.

20. A surface inspection method comprising:
acquiring a first orientation of a pattern on a surface of an object to be inspected, which is detected from the image obtained by imaging the surface; and
notifying a user of information indicating a relationship between a second orientation that gives a direction of imaging in which a sensitivity of detection by the imaging device is high and the first orientation.

* * * * *